(12) United States Patent
Nakagawa

(10) Patent No.: US 9,077,563 B2
(45) Date of Patent: Jul. 7, 2015

(54) SWITCH FOR IDENTIFYING EXTENDED GROUP INFORMATION OF PORTS

(75) Inventor: Yukihiro Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1128 days.

(21) Appl. No.: 12/625,726

(22) Filed: Nov. 25, 2009

(65) Prior Publication Data

US 2010/0135307 A1 Jun. 3, 2010

(30) Foreign Application Priority Data

Dec. 1, 2008 (JP) .................. 2008-305919

(51) Int. Cl.
*H04L 12/28* (2006.01)
*H04L 12/46* (2006.01)
*H04L 12/931* (2013.01)

(52) U.S. Cl.
CPC ............ *H04L 12/467* (2013.01); *H04L 49/354* (2013.01)

(58) Field of Classification Search
None
See application file for complete search history.

(56) References Cited

U.S. PATENT DOCUMENTS

| | | | |
|---|---|---|---|
| 7,804,768 B2 | 9/2010 | Sasaki | |
| 7,917,621 B2 | 3/2011 | Suzuki et al. | |
| 2003/0142672 A1* | 7/2003 | Chen et al. | 370/390 |
| 2005/0220096 A1 | 10/2005 | Friskney et al. | |
| 2006/0251065 A1 | 11/2006 | Hamamoto et al. | |
| 2006/0274768 A1 | 12/2006 | Suzuki et al. | |
| 2008/0159124 A1 | 7/2008 | Sasaki | |
| 2008/0186981 A1* | 8/2008 | Seto et al. | 370/395.53 |

FOREIGN PATENT DOCUMENTS

| | | |
|---|---|---|
| EP | 1 755 278 | 2/2007 |
| JP | 2003-318937 | 11/2003 |
| JP | 2004-336501 | 11/2004 |
| JP | 2006-279820 | 10/2006 |
| JP | 2006-339933 | 12/2006 |
| JP | 2007-532070 | 11/2007 |
| JP | 2008-167315 | 7/2008 |
| WO | 0051290 | 8/2000 |

OTHER PUBLICATIONS

European Search Report and Annex to the European Search Report dated Apr. 9, 2010 for corresponding European Application No. 09 17 6924.
Notification of Reason for Refusal dated Oct. 16, 2012, from corresponding Japanese Application No. 2008-305919.
Interrogation dated Jun. 25, 2013, from corresponding Japanese Application No. 2008-305919.

* cited by examiner

*Primary Examiner* — Jae Y Lee
*Assistant Examiner* — Alan Lindenbaum
(74) *Attorney, Agent, or Firm* — Katten Muchin Rosenman LLP

(57) ABSTRACT

A switch which includes a plurality of ports, each being assigned to any of VLAN groups, and outputs a packet received at any of the ports, the switch include: recording means in which partition information and an address table are recorded, the partition information indicating which of extended VLAN groups into which the ports are further logically partitioned, and the address table containing an entry in which a destination address, an output port, a VLAN group, and an extended VLAN group are associated with each other; acquisition means for acquiring a source address and acquiring group information of a VLAN; identification means for identifying group information of an extended VLAN; and registration means for registering in the address table the source address acquired by the acquisition means as the destination address, the port, the group information of the VLAN, and group information of the extended VLAN group.

1 Claim, 30 Drawing Sheets

| Port | Port-group1 | Port-group2 | management port-group |
|---|---|---|---|
| 1 | X | | X |
| 2 | X | | |
| 3 | | X | X |
| 4 | | X | |
| 5 | X(EXT) | | |
| 6 | | X(EXT) | |
| 7 | | | X(EXT) |
| ⋮ | ⋮ | ⋮ | ⋮ |
| 16 | ⋮ | ⋮ | ⋮ |

FIG. 8

| Port | VLANgroup | | Extended VLAN Port-group | | |
|---|---|---|---|---|---|
| | VLAN ID ≠ 4094 | VLAN ID = 4094 | Group 1 View from 1,2,5 | Group 2 View from 3,4,6 | Mng View from 7 |
| 1 | X | X | X | | X |
| 2 | X | | X | | |
| 3 | X | X | | X | X |
| 4 | X | | | X | |
| 5 | X | | X | | |
| 6 | X | | | X | |
| 7 | | X | X except 5 | Y except 6 | X |

- register setting
  - Extended VLAN Tag Register (port 5)
    - Extended VLAN ID=1
  - Extended VLAN Tag Register (port 6)
    - Extended VLAN ID=2
  - Extended VLAN Tag Register (port 7)
    - Extended VLAN ID=3

- Extended VLAN Tag Register (port 1)
    - Extended VLAN ID=4
  - Extended VLAN Tag Register (port 2)
    - Extended VLAN ID=5
  - Extended VLAN Tag Register (port 3)
    - Extended VLAN ID=6
  - Extended VLAN Tag Register (port 4)
    - Extended VLAN ID=7

■ register setting

· Extended VLAN Mapping Register 1
  · 1 (member) for [port 1,2,5]
· Extended VLAN Mapping Register 2
  · 1 (member) for [port 3,4,6]
· Extended VLAN Mapping Register 3
  · 1 (member) for [port 1,3,7]
· Extended VLAN Mapping Register 4        option for disabling
  · 1 (member) for [port 1,2,5,7] ( communication between downlink , [port 1,5,7] disabling
· Extended VLAN Mapping Register 5        option for disabling
  · 1 (member) for [port 1,2,5,7] ( communication between downlink , [port 1,5,7] disabling
· Extended VLAN Mapping Register 6        option for disabling
  · 1 (member) for [port 3,4,6,7] ( communication between downlink , [port 3,6,7] disabling
· Extended VLAN Mapping Register 7        option for disabling
  · 1 (member) for [port 3,4,6,7] ( communication between downlink , [port 3,6,7] disabling

| MAC address (destination address) | VLAN ID | extended VLAN ID | output port |
|---|---|---|---|
| 00:01:02:03:04:05 | 1 | 0 | 5 |
| 00:01:02:03:04:06 | 1 | 0 | 3 |
| 00:01:02:03:04:07 | 1 | 1 | 10 |
| 00:01:02:03:04:05 | 1 | 1 | 15 |

| MAC address (destination address) | VLAN ID | extended VLAN ID | output port |
|---|---|---|---|
| 00:01:02:03:04:05 | 1 | 0 | 5 |
| 00:01:02:03:04:06 | 1 | 0 | 3 |
| 00:01:02:03:04:07 | 1 | 1 | 10 |
| 00:01:02:03:04:05 | 1 | 1 | 15 |

FIG. 19

| MAC address (destination address) | VLAN ID | output port |
|---|---|---|
| 00:01:02:03:04:05 | 1 | 5 |
| 00:01:02:03:04:06 | 1 | 3 |
| 00:01:02:03:04:07 | 1 | 10 |
| 00:01:02:03:04:05 | 1 | 15 |

| MAC address (destination address) | VLAN ID | output port |
|---|---|---|
| 00:01:02:03:04:05 | 1 | 5 |
| 00:01:02:03:04:06 | 1 | 3 |
| 00:01:02:03:04:07 | 1 | 10 |
| 00:01:02:03:04:05 | 1 | 15 |

FIG. 25

| MAC address (destination address) | VLAN ID | output port |
|---|---|---|
| 00:01:02:03:04:05 | 1 | 5 |
| 00:01:02:03:04:06 | 1 | 3 |
| 00:01:02:03:04:07 | 1 | 10 |

| MAC address (destination address) | VLAN ID | output port |
|---|---|---|
| 00:01:02:03:04:05 | 1 | 5 |
| 00:01:02:03:04:06 | 1 | 3 |
| 00:01:02:03:04:07 | 1 | 10 |

2701

SWITCH FOR IDENTIFYING EXTENDED GROUP INFORMATION OF PORTS

CROSS REFERENCE TO RELATED APPLICATION

This application is based upon and claims the benefit of priority from the prior Japanese Patent Application NO. 2008-305919 filed on Dec. 1, 2008, the entire contents of which are incorporated herein by reference.

FIELD

The embodiment discussed herein are related to a switch including multiple ports logically partitioned using Virtual Local Area Networks (VLANs).

BACKGROUND

Blade servers which have an enclosure capable of housing multiple removable servers called blades have been developed and are becoming widely used. Each of the blades in a blade server includes hardware components such as a central processing unit (CPU), a memory, an input/output (I/O) bus, and a storage that are required for the blade to function as a server. The blade server also contains a switch blade which aggregates networks of the blades and controls packet forwarding between blades and to an external switch. Each blade can be connected to another blade in the blade server or to an external network through the switch blade.

In many network environments, a single blade server is shared by multiple divisions or business operations, which requires the switch contained in the switch blade to perform traffic separation according to the divisions or business operations in addition to traffic separation using conventional VLANs. In order to enforce switch partitioning according to divisions or business operations, facility called extended VLAN has been provided that enables partitions different from those of conventional VLANs to be dynamically set on the same switch.

FIG. 28 illustrates settings of a conventional VLAN and an extended VLAN. As illustrated in FIG. 28, multiple ports (ports 1 to 16) are provided in a switch 2800 which constitutes a switch blade. While the ports are provided on the same switch 2800, they are logically partitioned into groups using VLANs. For example, on the downlink side of the switch 2800 in FIG. 28, ports 1 and 2 are logically partitioned into VLAN group 1, ports 3 and 4 into VLAN group 2, port 5 into VLAN group 3, ports 6 to 8 into VLAN group 4, and ports 9 and 10 into VLAN group 5. On the uplink side, ports 11 to 13 are set to VLAN groups 1 to 3 and ports 14 and 15 to VLAN groups 4 and 5 (Port 16 in the example in FIG. 28 is reserved).

Each of the ports logically partitioned into the groups using VLANs is assigned a VLAN ID indicating the VLAN group to which the port belongs as follows:

VLAN group 1: VLAN ID 10
VLAN group 2: VLAN ID 20
VLAN group 3: VLAN ID 30
VLAN group 4: VLAN ID 10
VLAN group 5: VLAN ID 50

To forward any packets to an intended destination through the use of the switch 2800, the Media Access Control (MAC) address of the destination written in the packets are referred to first. A MAC address table for packet routing is maintained in an internal memory of the switch 2800 or an external memory accessible to the switch 2800. The MAC address table contains MAC addresses associated with the ports on the switch 2800.

The switch 2800 searches the MAC address table for a port having a MAC address that matches the MAC address of the destination and the VLAN group and causes the packet to be output through that port. In addition, the switch 2800 allows logical partitions to be dynamically set using extended VLANs as mentioned previously.

In the exemplary switch 2800 in FIG. 28, ports 1 to 5 on the downlink side and ports 11 to 13 on the uplink side belong to extended VLAN group A (with the extended VLAN ID of A) and ports 6 to 10 on the downlink side and ports 14 to 16 on the uplink side belong to extended VLAN group B (with the extended VLAN ID of B). Accordingly, when one wants to use partitioning other than logical partitioning using VLANs, packet forwarding based on settings of extended VLAN IDs such as extended VLAN ID A for Division 1 and extended VLAN ID B for Division 2 can be performed.

The details of the related art depicted in Patent document 1 and Patent document 2.
[Patent Document 1]
National Publication of International Patent Application No. 2007-532070
[Patent Document 2]
Japanese Laid-Open Patent Publication No. 2004-336501

However, when multiple logical partitions using extended VLANs are applied to conventional switches, the combination of MAC address and VLAN ID needs to be unique. Specifically, the same combination of MAC address and VLAN ID cannot be associated with different extended VLAN IDs. This is because if the same combination of MAC address and VLAN ID exists for more than one set of partition information, the controller of the switch learns entries of a forwarding database (FDB) by using only the VLAN ID and MAC address as keys without reflecting the extended VLAN ID. As a result, the switch attempts to pass a packet to a wrong port beyond the extended VLAN boundary and therefore the packets are discarded due to the extended VLAN violation.

The problem described above arises when the same MAC address value and the same VLAN ID value are set and the switch 2800 determines the destination of packets by referring to only the MAC address and VLAN ID written in incoming packets. Suppose for example a packet with destination MAC address A1 which is logically partitioned using extended VLAN ID A is input in the switch 2800 in FIG. 28. The input packet is output through a port (for example port 1) that has been learned as the port associated with MAC address A1. Here, "learned" means that association between the MAC address and the port through which the packet is to be forwarded to the MAC address has been set in a particular table (for example the MAC address table described above).

Then, suppose that another packet with the same MAC address A1 is input into the switch 2800 in FIG. 28 through port 2 which belongs to VLAN group 1 (with VLAN ID 10) associated with extended VLAN ID A. At this time, the switch 2800, which has to forward the packet, learns that a station with VLAN ID 10 and MAC address A1 is connected to port 1, as described above. Accordingly, when a packet with destination MAC address A1 is input through port 2 which belongs to VLAN group 1, the packet is output through port 1 in accordance with the learned information in the MAC address table.

Suppose that a packet with the same destination MAC address A1 logically partitioned using extended VLAN ID B is input into the switch 2800 in the state described above. In this case, the packet needs to be forwarded to a port associated with extended VLAN ID B. However, port 1 which has previously been learned with extended VLAN ID A will be incorrectly recognized as the output port.

For example, suppose a packet with destination MAC address A1 is input in the switch 2800 through port 6 which is logically partitioned using extended VLAN ID B and belongs to VLAN group 4 with the same VLAN ID 10. This time it is to be expected that the port is not learned yet and that the packet is to be output to ports (7, 8 and either 14 or 15) that belong to VLAN 10 in the extended VLAN B. Note that if an uplink includes multiple physical ports, those ports are treated as a single logic port with a technique called link aggregation. Specifically, a packet is forwarded to one of the physical ports on the basis of the MAC address or other identification.

However, the packet associated with VLAN ID 10 and with MAC address A1 is incorrectly recognized as being connected to port 1. Based on the incorrect recognition, the switch 2800 attempts to forward the packet to port 1, resulting in an extended VLAN violation (forwarding beyond the extended VLAN boundary), therefore the packets are discarded. Consequently, there has been a problem that correct routing is inhibited and packets are discarded.

Furthermore, when more than one types of logical partitioning are used using extended VLANs, packets cannot be forwarded from one blade server to another through an external switch because there would be more than one combination of MAC address and VLAN ID.

FIG. 29A illustrates operation for requesting communication between blade servers through an external switch. When packets received on the switch 2800 are to be forwarded to another blade server through the external switch 2900, the packets received on the switch 2800 from a downlink would be forwarded to a port different from the port at which the packets were received through the external switch 2900 connected to an uplink as depicted as route R1 in FIG. 29A.

In this case, however, the combination of MAC address and VLAN ID exist in both of extended VLAN groups A and B and the port group boundary would be crossed. This operation is an extended VLAN setting violation and the packets will be discarded.

FIG. 29B illustrates actual operation in blade server communication through an external switch. As illustrated in FIG. 29B, a MAC address that causes packets to pass through the external switch 2900 is assigned to the packets input from a downlink. In this actual operation, an incorrect packet output port is recognized inside the switch 2800. Packets that attempt to go across the border between groups A and B are discarded and correct packet forwarding cannot be achieved.

SUMMARY

According to an aspect of the embodiments, the switch includes a plurality of ports, each being assigned to any of groups into which the switch is logically partitioned using Virtual Local Area Networks (VLANs), and outputs a packet received at any of the ports to a port corresponding to a destination address of the packet, the switch comprising: recording means in which partition information and an address table are recorded, the partition information indicating which of extended VLAN groups into which the ports are further logically partitioned each of the ports is assigned to, and the address table containing an entry in which a destination address, an output port corresponding to the destination address, a VLAN group, and an extended VLAN group are associated with each other; acquisition means for acquiring a source address from the packet received on the port and acquiring group information of a VLAN to which the packet belongs from the packet or an attribute of the port; identification means for identifying group information of an extended VLAN to which the port at which the packet has been received is allocated by referring to the partition information recorded in the recording means; and registration means for registering in the address table the source address acquired by the acquisition means as the destination address, the port at which the packet has been received as the output port corresponding to the destination address, the group information of the VLAN acquired by the acquisition means as the VLAN group, and group information of the extended VLAN group identified by the identification means as the extended VLAN group in association with each other.

The object and advantages of the embodiments will be realized and attained by means of the elements and combinations particularly pointed out in the claims.

It is to be understood that both the foregoing general description and the following detailed description and are exemplary and explanatory and are not restrictive of the embodiments, as claimed.

BRIEF DESCRIPTION OF DRAWINGS

FIG. 8 is a table illustrating logical partitioning of VLANs and extended VLANs;

FIG. 9A is an illustration of exemplary register settings;

FIG. 9B is another illustration of the exemplary register settings;

FIG. 14 illustrates exemplary settings in a MAC address table built in the learning process in the first exemplary embodiment;

FIG. 16 illustrates exemplary settings in the MAC address table used in the look-up process in the first exemplary embodiment;

FIG. 19 illustrates exemplary settings in a MAC address table built in the learning process in the second exemplary embodiment;

FIG. 21 illustrates exemplary settings in the MAC address table used in the look-up process in the second exemplary embodiment;

FIG. 25 illustrates exemplary settings in a MAC address table built in a learning process in the third exemplary embodiment;

FIG. 27 illustrates exemplary settings in the MAC address table used in the look-up process in the third exemplary embodiment;

DESCRIPTION OF EMBODIMENTS

Figure 1:
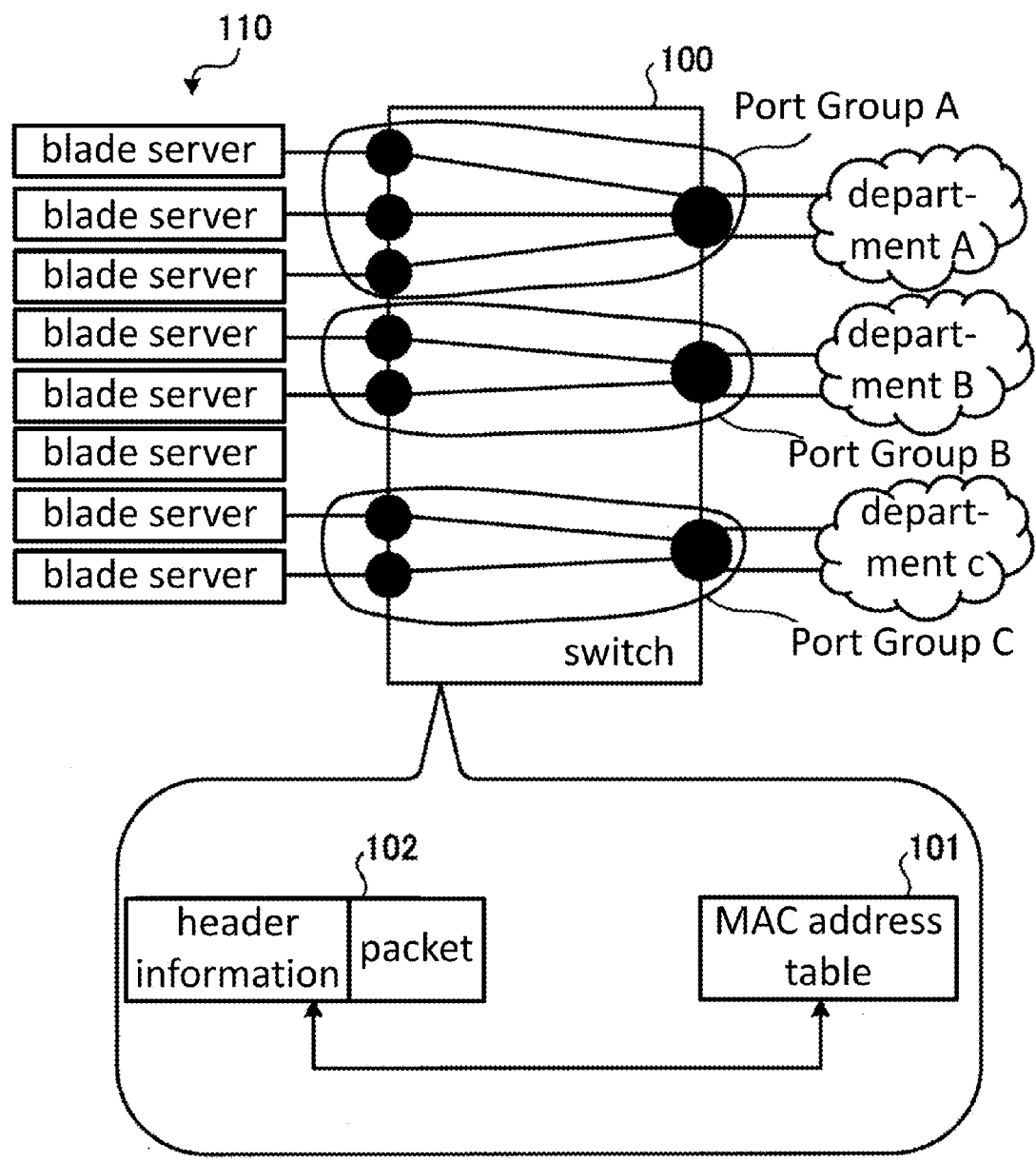
FIG. 1 illustrates an overview of partitioning by a switch according to an embodiment.

Preferred embodiments of the switch will be described below in detail with reference to the accompanying drawings.
Overview of Partitioning by Switch An overview of partitioning by a switch according to an embodiment will be provided first. FIG. 1 depicts an overview of partitioning using the switch according to the present embodiment. The switch 100 according to the present embodiment includes the following three features among others.

1. Each port provided on the switch 100 has an extended VLAN ID for partitioning that identifies a partition to which the port belongs.
2. There is provided a table that indicates associations between extended VLAN IDs identifying extended VLAN groups and ports as well as associations between VLAN ID identifying VLAN groups and the ports. Accordingly, a VLAN can be built within each partition.
3. Even through there is the same combination of MAC address and VLAN ID in more than one set of partition information, packets are unaffected by other partition information.

In the switch 100, the MAC address is extracted from header information added to an incoming packet 102 as shown in FIG. 1 and the VLAN ID is extracted from a VLAN tag, if any. If the packet 102 does not have a VLAN tag, the VLAN ID set for the port is referred to.

An extended VLAN ID of the port is extracted from partition information. The MAC address, VLAN ID, and extended VLAN ID are used as a key to refer to association information in a MAC address table 101. If a port associated with the VLAN ID and MAC address for the extended VLAN ID has not learned, that is, has not been set, the packet 102 is flooded so that the packet 102 is output through all ports that belong to the extended VLAN and the VLAN. On the other hand, a port associated with the VLAN ID and the MAC address for the extended VLAN ID has been learned, that is, has been set, the packet 102 is passed to the port set as the port used for forwarding the packet to the VLAN ID and the MAC address.

In this way, when packets 102 grouped using extended VLAN are input into the switch 100 according to the present embodiment, the switch 100 refers to the association among extended VLAN ID, VLAN ID, and MAC address to allow the packets 102 to be output through correct ports. Accordingly, even through there are the same combinations of MAC address and VLAN ID in more than one partition, the packets 102 are not affected by the other partitions and therefore a secure network environment can be provided. Specific configurations for achieving the partitioning described above will be described below.

Network Configuration

Figure 2:
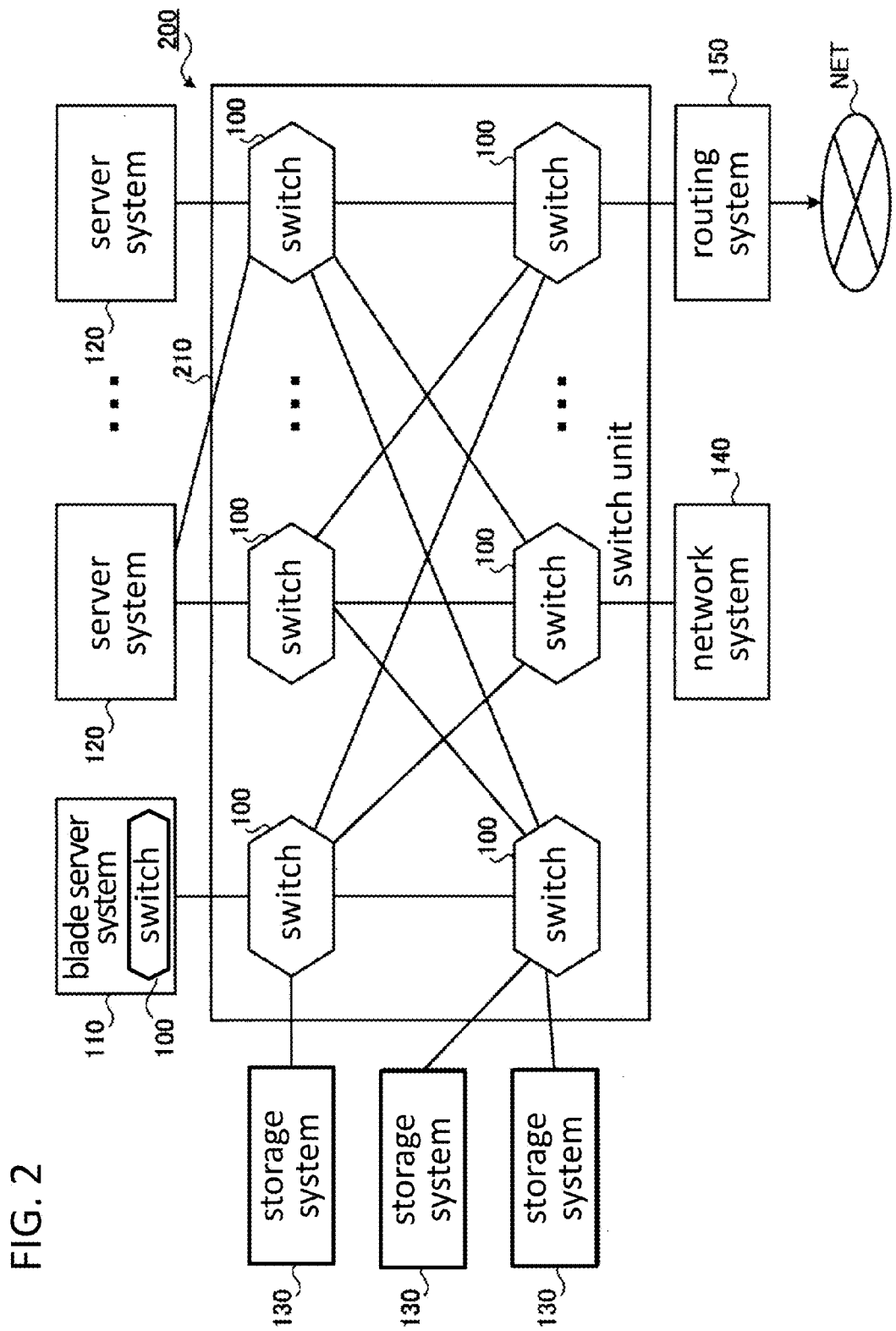
FIG. 2 illustrates an exemplary configuration of a network using a switch according to the present embodiment.

A network configuration using a switch according to the present embodiment will be described first. FIG. 2 is an illustration of an exemplary configuration of a network using a switch according to the present embodiment. A blade server system 110 in the network configuration 200 in FIG. 2 is connected to various systems such as server systems 120, memory systems 130, a network system 140, and a routing system 150 through a switch unit 210. The number of these systems can be varied by scaling up or down the configuration of the switch unit 210.

The server system 120 includes one or more CPUs and a plurality of memory units and performs processing in response to a request (packet) received through the switch unit 210. Each of the memory systems 130 includes an interface and a recording medium and allows other systems such as the blade server system 110 and the server systems 120 accessing the memory system to refer to information recorded on the recording medium or to update information on the recording medium.

As depicted in FIG. 2, the blade server system 110 and the server systems 120 may be connected to another network system 140 through the switch unit 210. In addition, the blade server system 110 and server systems 120 can connect to the routing system 150 to connect to any network (NET), thereby routing packets 102. The blade server system 110 may be used in an environment in which packets 102 are forwarded not only through the blade servers in the same system but also through more than one network.

Configuration of Switch

Figure 3:
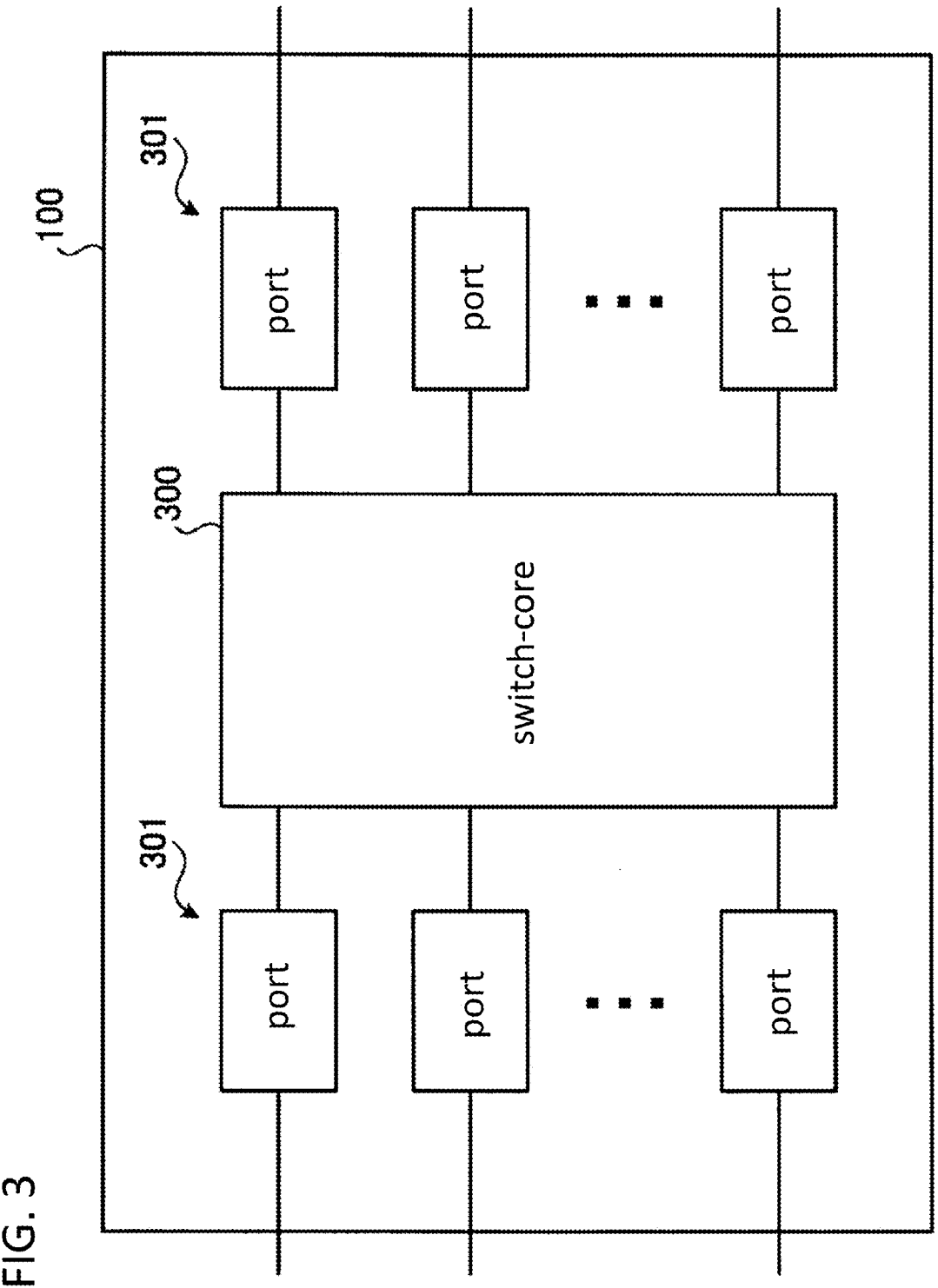
FIG. 3 is a block diagram illustrating a configuration of the switch.

A configuration of the switch according to the present embodiment will be described below. FIG. 3 is a block diagram illustrating a configuration of the switch. As depicted in FIG. 3, the switch 100 includes a switch core 300 which switches packets 102 and a plurality of ports 301 for inputting and outputting packets 102. A packet 102 received on each port 301 is output through a port 301 associated with its destination (MAC address) under the control of the switch core.

Figure 4:
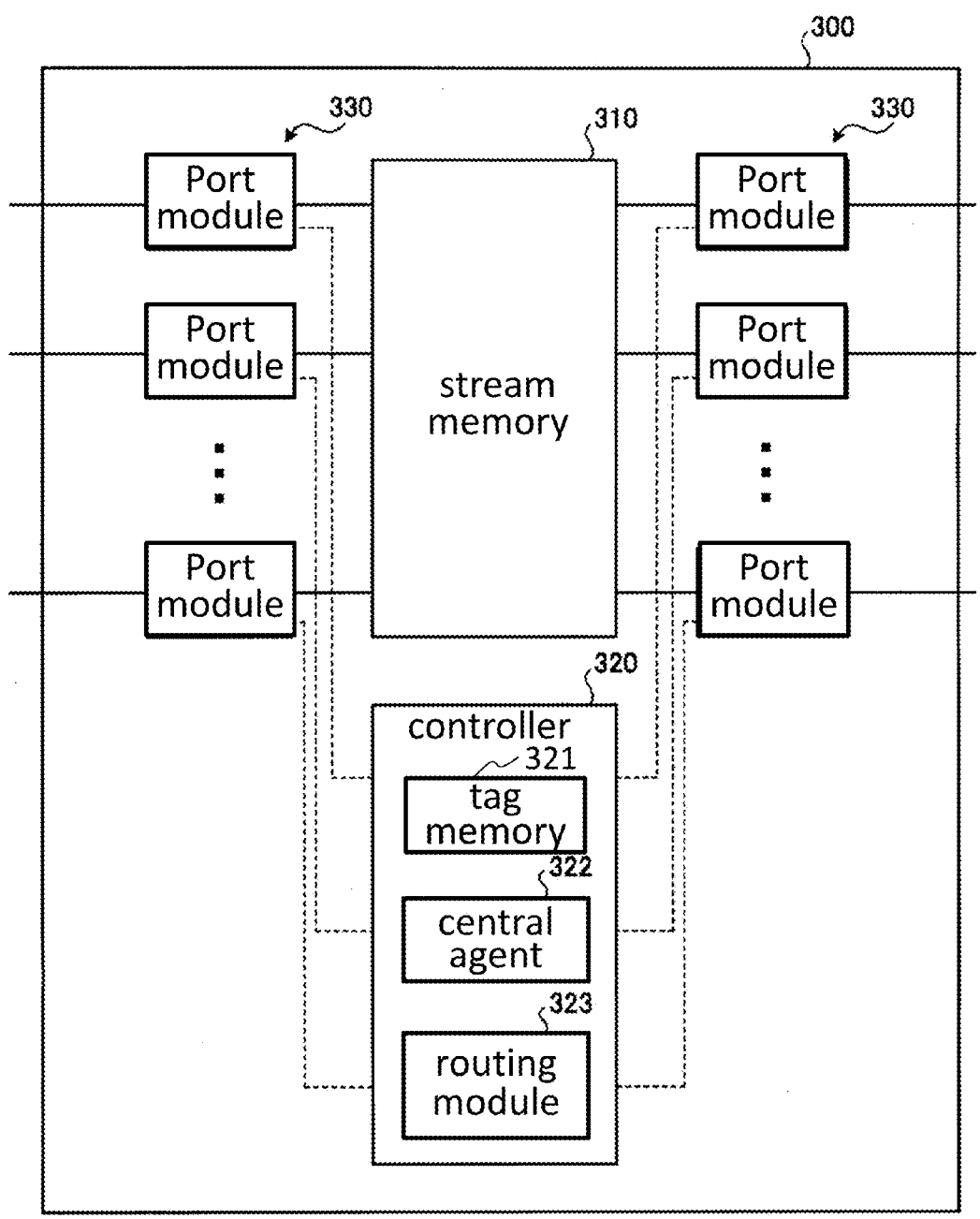
FIG. 4 is a block diagram illustrating a configuration of a switch core.

A configuration of the switch core 300 will be described in detail below. FIG. 4 is a block diagram depicting a configuration of the switch core 300. As depicted in FIG. 4, the switch core 300 includes a stream memory 310, a controller 320, and a plurality of port modules 330. Provided within the controller 320 are a tag memory 321, a central agent 322, and a routing module 323. The stream memory 310, the controller 320, the plurality of port modules 330 and the components (321 to 323) of the controller 320 are interconnected through a bus or a plurality of other links. Examples of implementation of the switch core 300 include, but not limited to, a single IC and LSI.

When a packet 102 is input into the switch core 300 from an external source through any of the port modules 330, the stream memory 310 provided in the switch core 300 temporarily stores the packet 102. Accordingly, the stream memory 310 functions as a memory shared by the port modules 330. The port module 330 extracts information indicating the destination and VLAN from the incoming packet 102 and sends the information to the controller 320. The packet 102 temporarily stored in the stream memory 310 is then output to any of the port module 330 in response to an instruction from the controller 320.

The controller 320 receives information indicating the destination and the VLAN from any of the port modules 330 described above and identifies a port module 330 through which the packet 102 is to be forwarded to the destination. The controller 320 controls the switch core 300 so that the packet 102 stored in the stream memory 310 is output through the identified port module 330.

Specifically, the tag memory 321 is a functional unit functioning as a link list indicating which information (packet) is stored in which location in the stream memory 310. The tag memory 321 contains address information of the stream memory 310. When a new packet 102 is stored in the stream memory 310, an address indicating the storage area of the packet 102 is stored in the tag memory 321. Accordingly, states of the storage areas in the stream memory 310 can be identified by referring to the tag memory 321.

The central agent 322 is a functional unit that controls allocation of storage areas in the stream memory 310. Accordingly, when a new packet 102 is input in the stream memory 310, the central agent 322 allocates a storage area to the packet 102.

The routing module 323 is a functional unit that controls which of the port modules 330 is to be used to output a packet 102 stored in the stream memory 310 and is the principal feature of the switch 100. The routing module 323 includes a MAC address table 101 and partition information which are referred to when packets 102 are forwarded. When a packet 102 is input through any of the port modules 330, the routing module 323 obtains frame information from the header of the packet 102 and refers to the MAC address table 101 and the partition information to determine an output port corresponding to the VLAN group and extended VLAN group to which the packet 102 belongs and the MAC address of the destination. After determining the output port, the routing module 323 causes the packet 102 temporarily stored in the stream memory 310 to be output through the appropriate port module 330.

In this way, in the switch 100 according to the present embodiment, the MAC address table 101 (including extended VLAN IDs indicating extended VLANs) and the partition information are added to the routing module 323 which controls packet forwarding and an output port is determined by referring to these added items of information, so that packet forwarding based on a determined extended VLAN setting can be performed. As depicted in FIGS. 3 and 4, the configuration of the switch 100 itself is the same as conventional ones. Accordingly, packet forwarding according to the present embodiment can be achieved simply by rewriting information stored in the routing module and a control program for conventional switches.

Packet Forwarding Process

Figure 5:
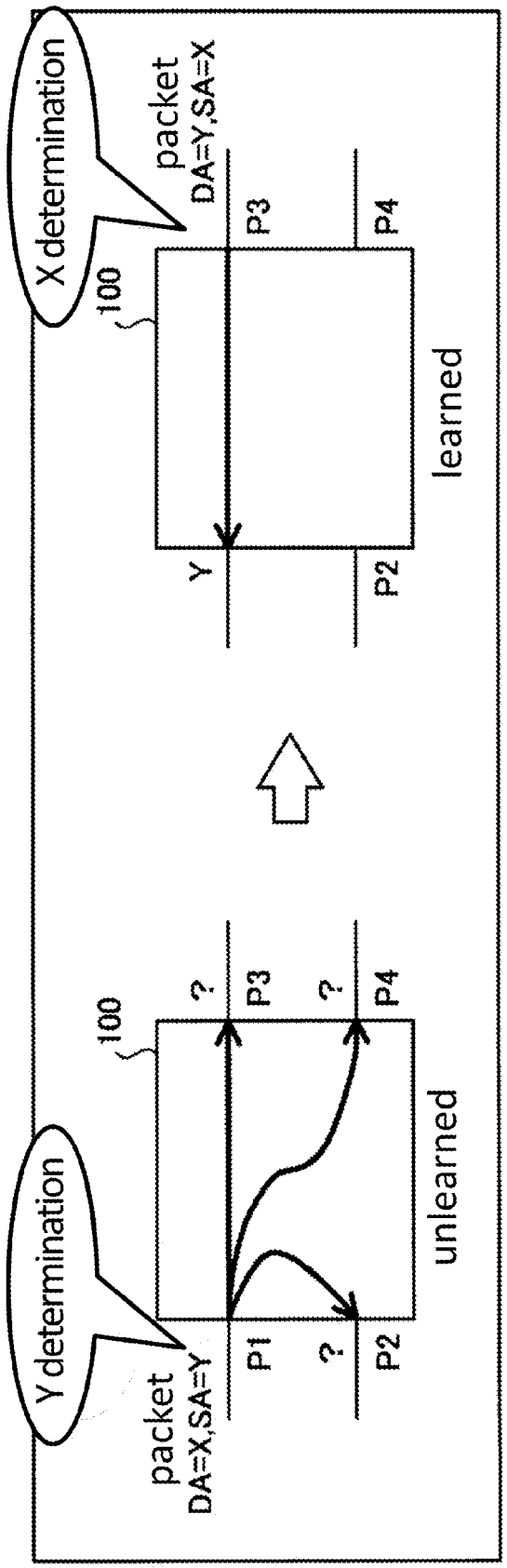
FIG. 5 illustrates a packet forwarding process.

A packet forwarding process performed by the routing module 323 will be described with respect to a specific example. FIG. 5 is an illustration of the packet forwarding process. Details of the configuration of the switch 100 are omitted from FIG. 5. Packet forwarding will be particularly described with reference to FIG. 5. Input of a packet 102 into any of the port module 330 places the switch 100 in a packet 102 reception state. The switch 100 then causes the received packet 102 to be output through a port corresponding to the destination address written in the header of the packet 102 to forward the packet 102 to the intended destination.

The header of a packet 102 typically contains, as added information, source MAC address (SA) representing the source address of the packet 102 and destination MAC address (DA) representing the destination address of the packet 102. Accordingly, when a packet 102 is input through any of the port modules 330, the switch 100 uses the DA in the packet 102 as a key to refer to the MAC address table 101 to determine a port through which the packet 102 is to be output.

Associations between MAC addresses in the MAC address table 101 and output ports through which a packet 102 is to be output are learned one after another by executing an actual packet forwarding process. Specifically, before learning an association between a MAC address and an output port, the switch 100 cannot obtain information about the port through which a packet 102 is to be output from the MAC address table 101.

When a packet 102 with an unlearned association is input into port P1 as illustrated in FIG. 5, the switch 100 cannot obtain information about an output port corresponding to the DA written in the header of the packet 102. Therefore, the switch 100 forwards the packet 102 to all ports (ports P2 to P4) except port P1. Such forwarding is called flooding. As a result, for port P1, the address Y corresponding to the SA written in the header of the packet 102 received is determined. Accordingly, association between the MAC address Y and port P1 is written in the MAC address table 101 of the switch 100. Thus, the association between MAC address Y and port P1 have been learned.

Suppose for example that a packet 102 is received at port P3 after port P1 has been learned and DA=Y is written in the header of the packet 102. Since Port P1 associated with MAC address Y has been learned as described above, the received packet 102 is forwarded through port P1. At this time, it is also learned from SA=X written in the received packet 102 that port P3 is associated with MAC address X. In this way, each association between a MAC address and a port is learned from SA in a packet 102 input into the switch 100 through the port, and ultimately the MAC address table 101 in which data rows representing the associations are set is completed.

Extended VLAN

Extended VLANs used in the switch 100 according to the present embodiment will be described next. To set extended VLANs, partition information is set in dedicated extended VLAN mapping registers to logically partition the switch 100, in addition to setting a conventional VLAN table.

For example, if 64 extended VLANs 0 to 63 are used, the following items of partition information are set in the extended VLAN mapping registers 0 to 63.

Address (address setting information): 00f00h (for extended VLAN 0) to 00ffch (for extended VLAN 63)

Up to 64 extended VLANs can be defined by setting addresses 00 to fc.

Filed definition (port group setting information): [15:0]
Extended VLAN port map for extended VLAN ID
0: not member, 1: member Only extended VLANs that are set as members (extended VLAN IDs for which "1" is set) can communication with each other.

Default value (default value setting information): 0000ffffh (extended VLAN 0), 0 (extended VLANs 1 to 63)

The default value represents that all ports belong only to a partition with extended VLAN ID 0. The default value indicates the initial state in which all ports are included in extended VLAN 0 on a 16-port switch.

Extended VLAN tag registers are provided for each port in the switch and the following items of partition information are set in the registers. Basically, the information is provided for each of the ports. However, extended VLAN tag registers of the ports may be collectively provided in one routing table.

Address (address setting information): base+034h

Field definition (port group setting information): [21:16] Extended VLAN ID (extended VLAN ID setting)

This information defines port default and extended VLAN ID.

Default value (default value setting information): 0

In this way, these items of extended VLAN partition information given above are stored in the routing module 323 of the switch 100. The partition information may be stored in each port module and referred to by the routing module 323.

Logical Partitioning of Switch

Figure 6:
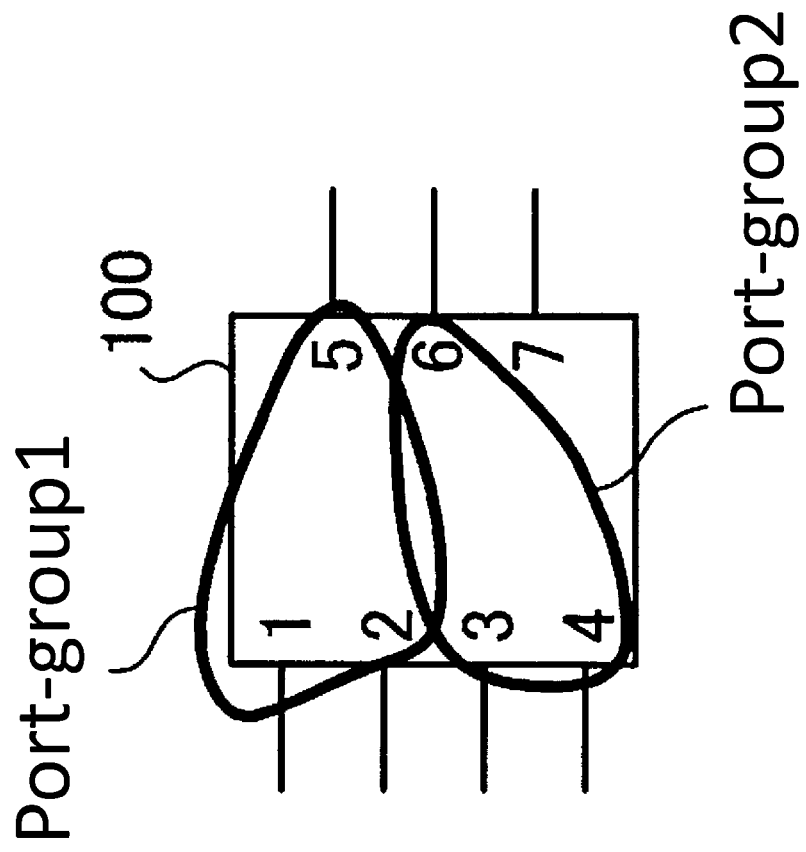
FIG. 6 illustrates exemplary grouping of ports.
Figure 7:
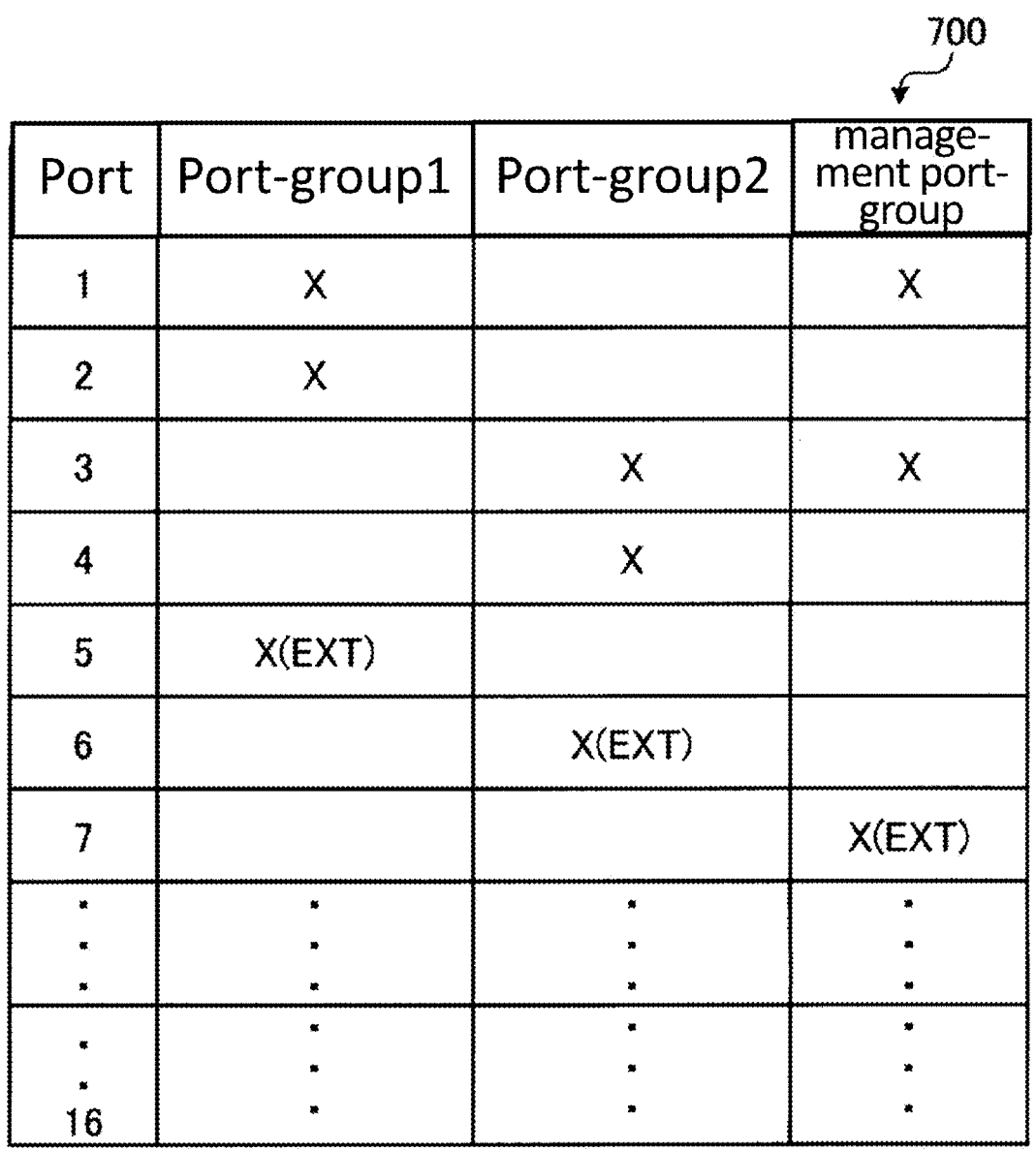
FIG. 7 is a table illustrating grouping of ports and management port settings.

Partitioning of the switch 100 using VLANs and extended VLANs, that is, logical partitioning of the switch 100 will be described next. FIG. 6 illustrates exemplary grouping of ports. FIG. 7 is a table illustrating grouping of the ports and management port settings. FIG. 6 schematically illustrates 7 ports 1 to 7 among the 16 ports of the switch 100. As illustrated in the table 700 of FIG. 7, these ports are logically partitioned using VLANs.

Specifically, ports 1, 2 and 5 belong to port group 1 and ports 3, 4, and 6 belong to port group 2. Port 1 is used as a management port for a service LAN of port group 1, port 3 is used as a management port for a service LAN of port group 2, and port 7 is used as a management port for the service LANs of both of the port groups. Ports 5, 6, and 7 are uplink ports connected to an external network (EXT).

FIG. 8 is a table illustrating logical partitioning using VLANs and extended VLANs. The switch 100 is logically partitioned using extended VLAN as illustrated in the table 800. Port groups (port groups 1 and 2 and a management group (Mg)) are partitioned using extended VLANs. VLAN groups are partitioned into a group consisting of member ports 1, 3, and 7 for management packets (VLAN ID=4094) and a group consisting of member ports 1 to 6 for data packets (VLAN ID≠4094).

FIGS. 9A and 9B illustrate exemplary register settings. Registers are set individually for the ports logically partitioned using extended VLANs in register setting files 910 and 920. When the registers are set, an extended VLAN ID is assigned to each port so that an option for disabling communication between downlinks can be set. If the option for disabling communication between downlinks is not supported, the same extended VLAN ID may be assigned to the ports that belong to one port group.

Figure 10A:
FIG. 10A is a table illustrating ports that packets in port group 1 and 2 can reach.
Figure 10B:
FIG. 10B is a table illustrating ports that packets in management group can reach.

FIG. 10A is table illustrating ports that packets in port group 1 and 2 can reach. FIG. 10-2 is a table illustrating ports that packets in management group can reach.

Since ports 1, 2 and 5 belong to the same group as described with respect to table 800, the ports represented by dot meshed cells in tables 1010 and 1020 are the ports that packets 102 in port group 1 can reach. Similarly, since ports 3, 4 and 6 belong to the same group, the ports represented by diagonally shaded cells are the ports that packets 102 can reach. Ports 1 and 2 provide communication between downlinks. Similarly, ports 3 and 4 provide communication between downlinks. Port 7 is a management port and the ports represented by cross-striped cells are the ports that packets 102 directed to port 7 can reach.

Packet Forwarding Using Partition Information

Packet forwarding using partition information, which is a feature of the switch 100 according to the present embodiment, will be described next. As mentioned previously, the principal feature of the switch 100 according to the present invention is the packet forwarding process performed by the routing module 323.

Figure 11:
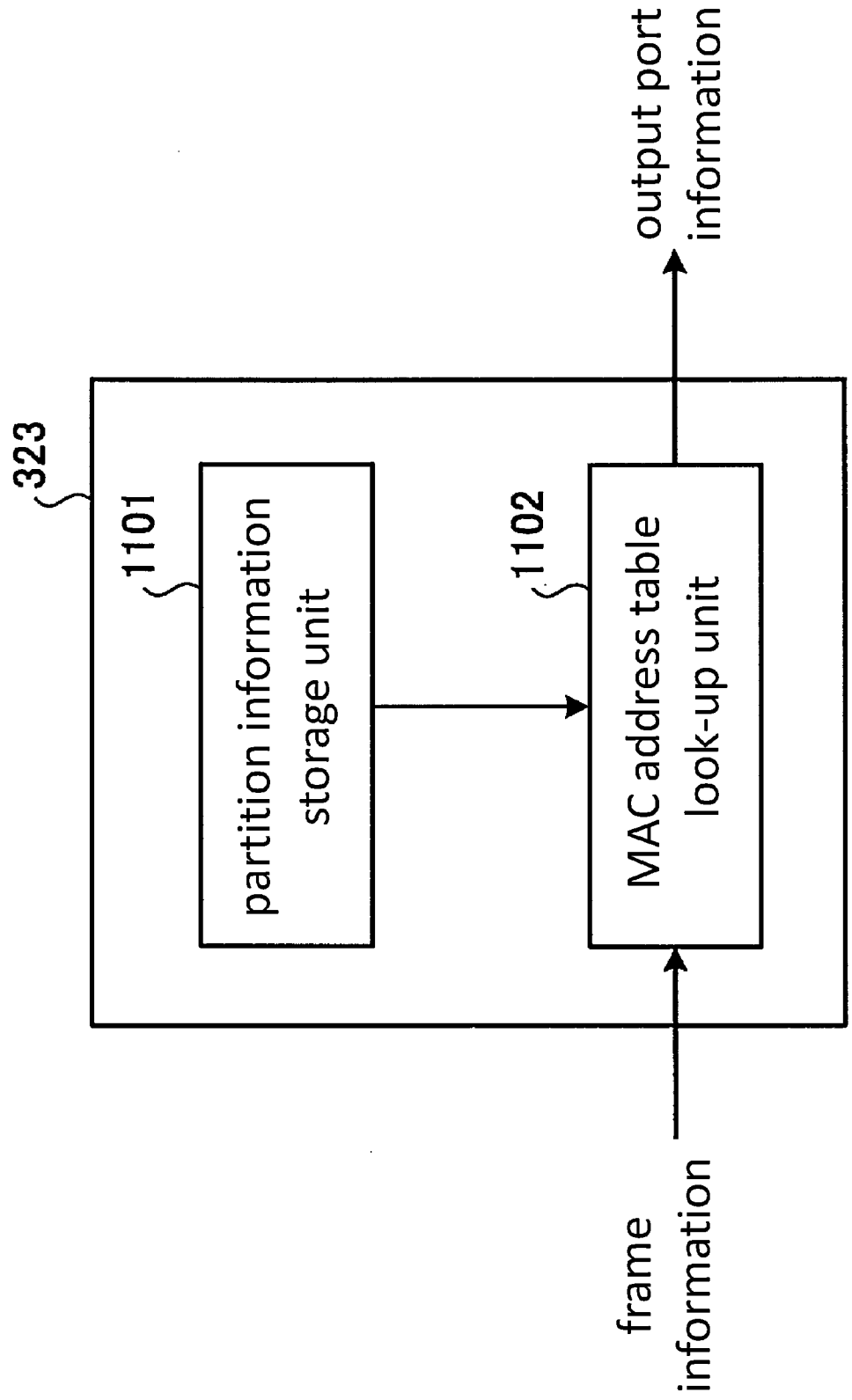
FIG. 11 is an illustration of a packet forwarding process in the present embodiment.

FIG. 11 illustrates the packet forwarding process according to the present embodiment. As illustrated in FIG. 11, the routing module 323 includes a partition information storage unit 1101 which functions as recording means in which partition information is recorded and a MAC address table look-up unit 1102 which functions as acquisition means for acquiring information required for packet forwarding from packets in order to control packet forwarding and as identification means for identifying to which VLAN groups and extended VLAN groups a packet 102 belongs.

As illustrated in FIG. 4, the routing module 323 obtains frame information from a packet 102 which has been stored in the stream memory 310 through the port module 330. The routing module 323 obtains the MAC address (DA) of the destination of the packet 102 and the VLAN ID from the frame information. The routing module 323 reads an extended VLAN ID which is set as partition information from the partition information storage unit 1101 to determine an output port to which the packet 102 is to be forwarded. Three exemplary packet forwarding processes (first to third exemplary embodiments) by the switch 100 configured as described above will be described below.

First Exemplary Embodiment

Figure 12:
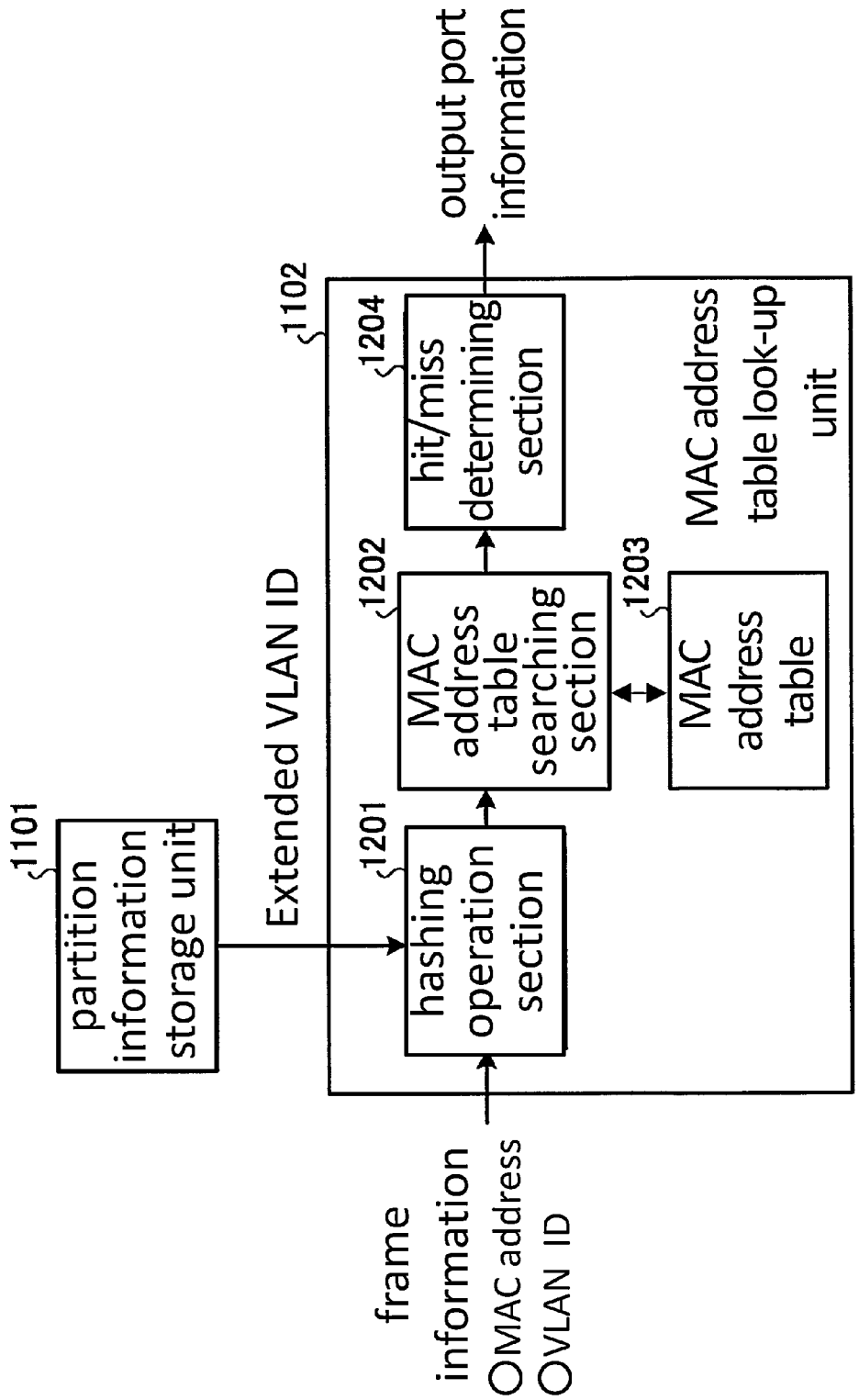
FIG. 12 is a block diagram illustrating a configuration of a routing module in a first exemplary embodiment.

A first exemplary embodiment will be described first. In the first exemplary embodiment, a packet forwarding process is performed by referring to an extended VLAN ID in addition to conventional VLAN ID and MAC address. FIG. 12 is a block diagram illustrating a configuration of the routing module in the first exemplary embodiment. As illustrated in FIG. 12, a MAC address table look-up unit 1102 includes a hashing operation section 1201, a MAC address table searching section 1202, a MAC address table 1203, and a hit/miss determining section 1204.

When a packet 102 is input into any of the ports 301 of the switch 100, frame information from the input packet 102 is input into the MAC address table look-up unit 1102. The MAC address and VLAN ID included in the frame information are input into the hashing operation section 1201. At the same time, the port into which the packet 102 has been input is referred to and the extended VLAN ID of the VLAN to which the packet 102 belongs which is read from the partition information storage unit 1101 is input into the hashing operation section 1201. The hashing operation section 1201 uses these items of input information to calculate a hash value. The calculated hash value is input into the MAC address table searching section 1202, which uses the hash value for searching the MAC address table 1203.

The MAC address table 1203 contains a MAC address, VLAN ID, and extended VLAN ID associated with each corresponding port as a data row. The MAC address table searching section 1202 functions as searching means for searching through the multiple data rows contained in the MAC address table 1203 for a data row corresponding to the input packet 102.

Specifically, the MAC address table searching section 1202 obtains multiple MAC table entries with the same hash value as the input hash value and searches for the same MAC address (destination address), VLAN ID (VLAN group information), and extended VLAN ID (extended VLAN group information). If MAC address table searching section 1202 finds the same MAC address, VLAN ID, and extended VLAN ID, the MAC address table searching section 1202 outputs a signal indicating the hit of the search and output port information to the hit/miss determining section 1204.

On the other hand, if the same MAC address, VLAN ID, and extended VLAN ID are not found from among the multiple MAC table entries obtained using the input hash value, the MAC address table searching section 1202 outputs a signal indicating that no hit has been found. At the same time, the association among the MAC address, VLAN ID, and extended VLAN ID learned at this point is registered in the MAC address table 1203 if the association has not yet been learned. Thus, the MAC address table searching section 1202 also functions as registration means for registering a new data row (information representing the association among MAC address, VLAN ID and extended VLAN ID) in the MAC address table 1203.

The hit/miss determining section 1204 functions as determination means for determining an output port to be used for forwarding the input packet 102 to its destination address. Specifically, when the signal indicating a hit and output port information are input from the MAC address table searching section 1202 into a corresponding port, the hit/miss determining section 1204 outputs the output port information to the port module 330 corresponding to the output port in order to cause the packet 102 stored in the stream memory 310 to be output through the output port.

When the signal indicating that no hit has been found is input from the MAC address table searching section 1202 into the hit/miss determining section 1204, the hit/miss determining section 1204 causes the packet 102 stored in the stream memory 310 to be flooded. Specifically, the hit/miss determining section 1204 outputs a flooding instruction to each of the port modules 330 that belong to the same extended VLAN and the same VLAN as the packet 102.

A learning process and a look-up process performed by the routing module 323 in the first exemplary embodiment will be separately described below. It is assumed in the following description that the partition information given below is stored in the partition information storage unit 1101. The port configuration illustrated in FIG. 28 will be used as an example in the following description.

Partition Information
Extended VLAN 0: Ports 1, 2, 3, 4, 5, 11, 12, 13
Extended VLAN 1: Ports 6, 7, 8, 9, 10, 14, 15, 16

Learning Process

Figure 13:
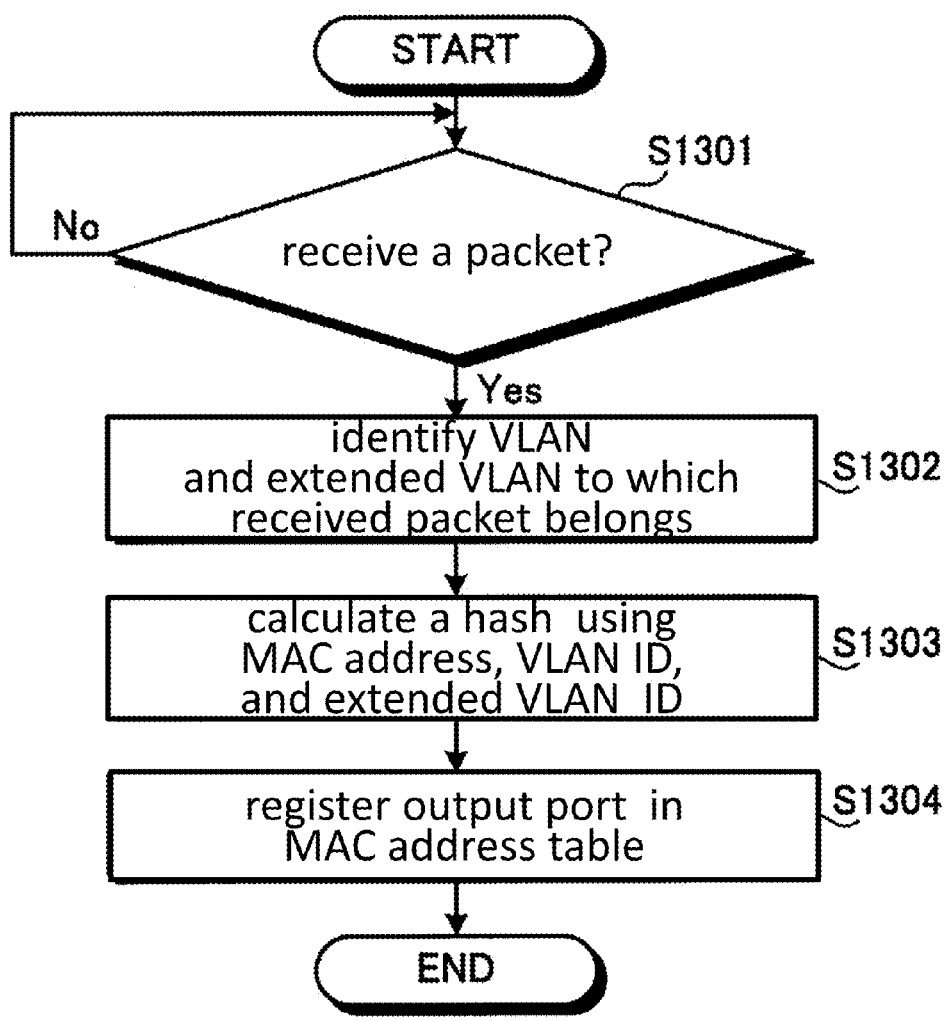
FIG. 13 is a flowchart illustrating a procedure of a learning process for packet forwarding in the first exemplary embodiment.

A learning process procedure for packet forwarding in the first exemplary embodiment will be described first. FIG. 13 is a flowchart of a learning process procedure for packet forwarding in the first exemplary embodiment. In the flowchart of FIG. 13, determination is made first as to whether any of the ports 301 of the switch 100 has received a packet 102 (step S1301). The process is in a wait state until it is determined that a packet 102 has been received (the "No" loop at step S1301). When it is determined that a packet 102 has been received ("Yes" at step S1301), a VLAN and an extended VLAN to which the received packet 102 belongs are identified (step S1302).

When the VLAN ID and extended VLAN ID port groups are identified at step S1302, a hash value is calculated by using the MAC address, the VLAN ID, and the extended VLAN ID (step S1303). An output port as well as the MAC address, VLAN ID, and extended VLAN ID of an entry indicated by the hash value calculated at step S1303 is registered as a data row in the MAC address table (step S1304) and then the learning process will end.

FIG. 14 is a table illustrating exemplary settings in the MAC address table built in the learning process in the first exemplary embodiment. In an actual MAC address table, there are provided a MAC address column in which destination addresses are to be registered, a VLAN ID column in which VLAN group information is to be registered, and an extended VLAN ID column in which extended VLAN group information is to be registered. A port column in which output ports are to be registered is also provided.

As illustrated in the MAC address table 1400 of FIG. 14, a corresponding port, "5", is set in data row 1401 and a corresponding port, "15", is set in data row 1402 despite containing the same MAC address and the same VLAN ID. In this way, different kinds of partitioning can be applied to the same MAC address by adding extended VLAN ID information.

Look-Up Process

Figure 15:
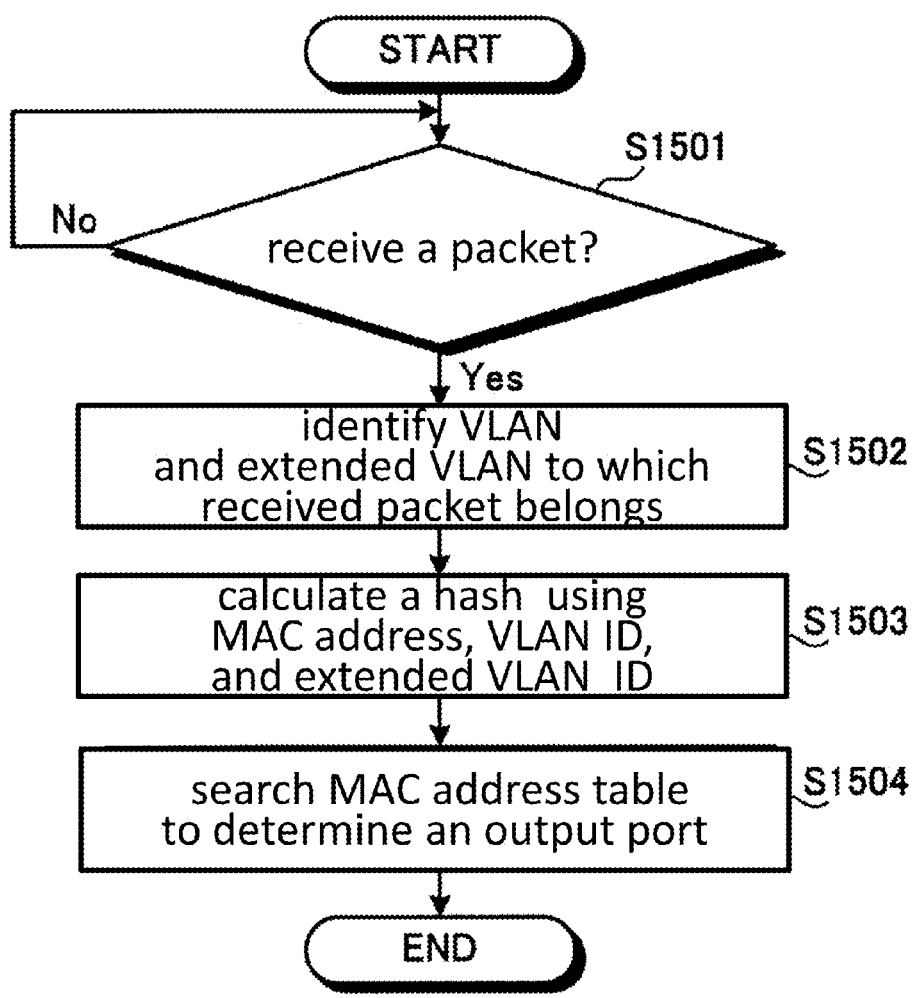
FIG. 15 is a flowchart illustrating a look-up process procedure for packet forwarding in the first exemplary embodiment.

A look-up process procedure for packet forwarding in the first exemplary embodiment will be described next. FIG. 15 is a flowchart illustrating a look-up process procedure for packet forwarding in the first exemplary embodiment. In the flowchart of FIG. 15, determination is made first as to whether any of the ports 301 of the switch 100 has received a packet 102 (S1501). The process is in a wait state until it is determined that a packet 102 has been received (the "No" loop at step S1501). When it is determined that a packet 102 has been received ("Yes" at step S1501), the VLAN and extended VLAN to which the received packet 102 belongs are identified (step S1502).

When the VLAN and the extended VLAN are identified at step S1502, a hash value is calculated by using the MAC address, the VLAN ID, and the extended VLAN ID (step S1503). The hash value calculated at step S1503 is used to search the MAC address table to determine an output port (step S1504) and then the look-up process will end.

FIG. 16 is a table illustrating exemplary settings in the MAC address table used in the look-up process in the first exemplary embodiment. In packet forwarding in a conventional switch, if data rows containing the same MAC address and the same VLAN ID, like data rows 1601 and 1602 of the MAC address table 1600, are referred to, a correct output port cannot be determined because the two data rows are exactly identical to each other. In the first exemplary embodiment, in contrast, correct output port can be determined because extended VLAN IDs are also used in search and data rows 1601 and 1602 include different extended VLAN ID values.

As has been described above, in the first exemplary embodiment, the extended VLAN ID of the VLAN to which a packet 102 belongs is identified as partition information from the port through which the packet 102 has been input, and then MAC address, VLAN ID, and extended VLAN ID are referred to, thereby correct packet forwarding can be achieved according to the partition.

Second Exemplary Embodiment

A second exemplary embodiment will be described next. As in conventional packet forwarding, an output port is determined by referring to a VLAN ID and MAC address in the second exemplary embodiment. In doing this, a port bitmap of extended VLAN ID is used to mask data rows of ports to which search is not applied among the data rows stored in a MAC address table, thereby excluding the ports from search.

Figure 17:
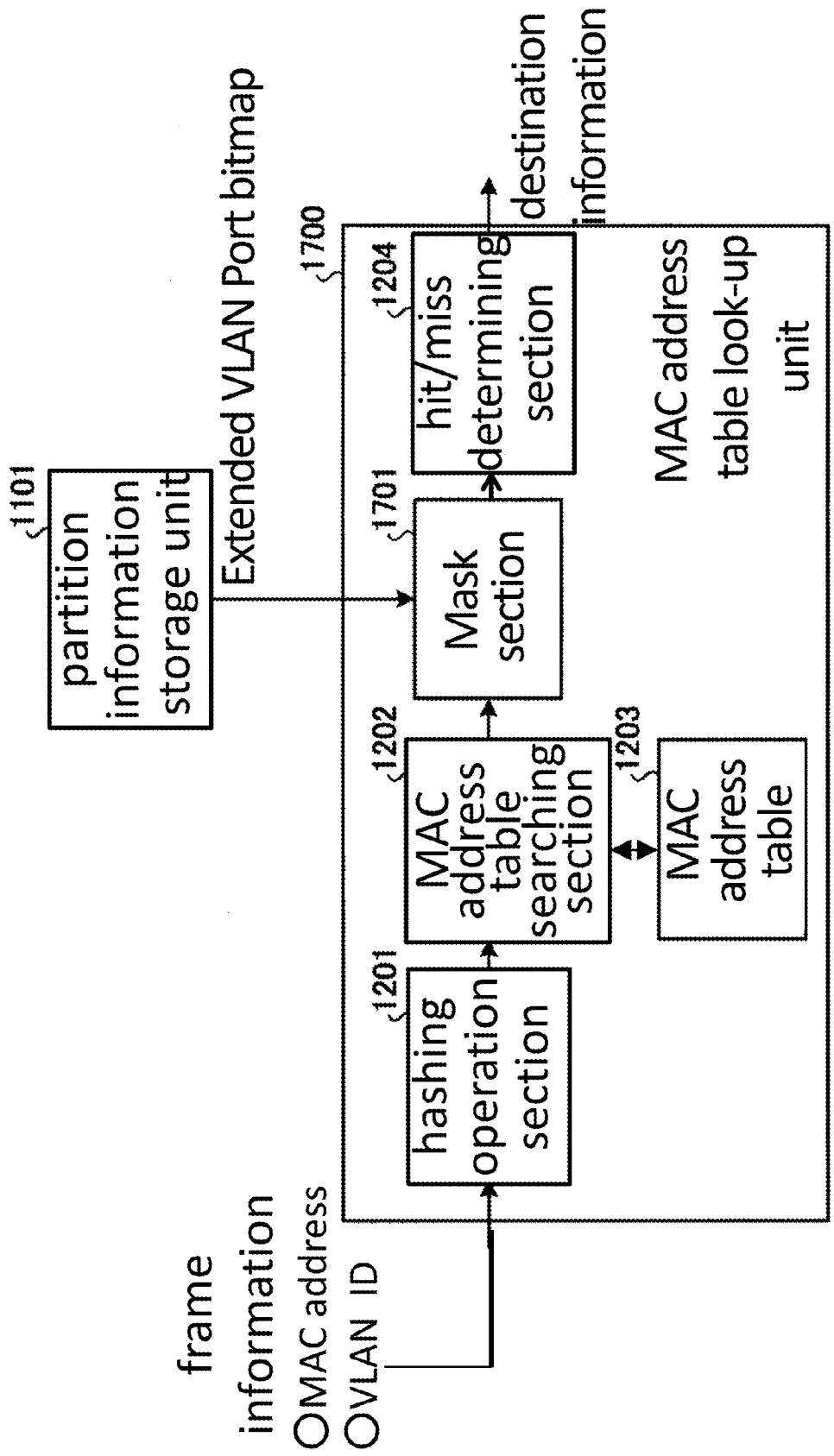
FIG. 17 is a block diagram illustrating a configuration of a routing module in a second exemplary embodiment.

FIG. 17 is a block diagram illustrating a configuration of a routing module in the second exemplary embodiment. As illustrated in FIG. 17, a MAC address table look-up unit 1700 in the second exemplary embodiment includes a masking section 1701 added between a MAC address table searching section 1202 and a hit/miss determining section 1204.

It is assumed here that the following extended VLANs and corresponding extended VLAN mapping register setting values are set.

Extended VLAN Information
Extended VLAN 0: Ports 1, 2, 3, 4, 5, 11, 12, 13
Extended VLAN 1: Ports 6, 7, 8, 9, 10, 14, 15, 16
Corresponding extended VLAN mapping register setting values
Extended VLAN 0: 0001_1100_0001_1111b
Extended VLAN 1: 1110_0011_1110_0000b When a search result is input from the MAC address table searching section 1202 into the masking section 1701, the masking section 1701 retrieves an extended VLAN port bitmap from a partition information storage unit 1101. Unlike the MAC address table searching section 1202 of the first exemplary embodiment, the MAC address table searching section 1202 of the second exemplary embodiment does not refer to an extended VLAN ID. Therefore, more than one port with the same MAC address and the same VLAN ID may be found (for example data rows 1601 and 1602 of the MAC address table 1600 in FIG. 16).

Therefore, the masking section 1701 carries out the AND between each of the ports input into the masking section 1701 as the search result and the extended VLAN port bitmap to nullify (0) the value of the ports with different extended VLANs. Specifically, if it is determined from the port through which the packet 102 has been input that the packet 102 belongs to extended VLAN group 0 (extended VLAN ID 0), masking is applied to port 5 input as the search result.

First, port 5 is converted into a vector, "0000_0000_0001_0000b". The vector value converted from port 5 is ANDed with extended VLAN 0 to obtain "0000_0000_0001_000b". Therefore, port information indicating port 5 belongs to extended VLAN group 0 and consequently port 5 is output as the output port to the hit/miss determining section 1204.

On the other hand, when port 15 is input as the search result, port 15 is converted to a vector, "1000_0000_0000_0000b". The vector value is ANDed with extended VLAN group 0 to obtain the value "0000_0000_0000_0000b". As a result of the AND, the value of port 15 becomes 0 and it is determined that the port 15 does not belong to extended VLAN 0. In this case, the masking section 1701 does not output port information indicating port 15 to the hit/miss determining section 1204.

Even though more than one port with the same MAC address and the same VLAN ID is found, the value of extended VLAN ID is used to apply the masking, only the port with the matching extended VLAN ID is used as a correct output port. A learning process and a look-up process performed by the routing module 323 in the second exemplary embodiment will be separately described below.

Learning Process

Figure 18:
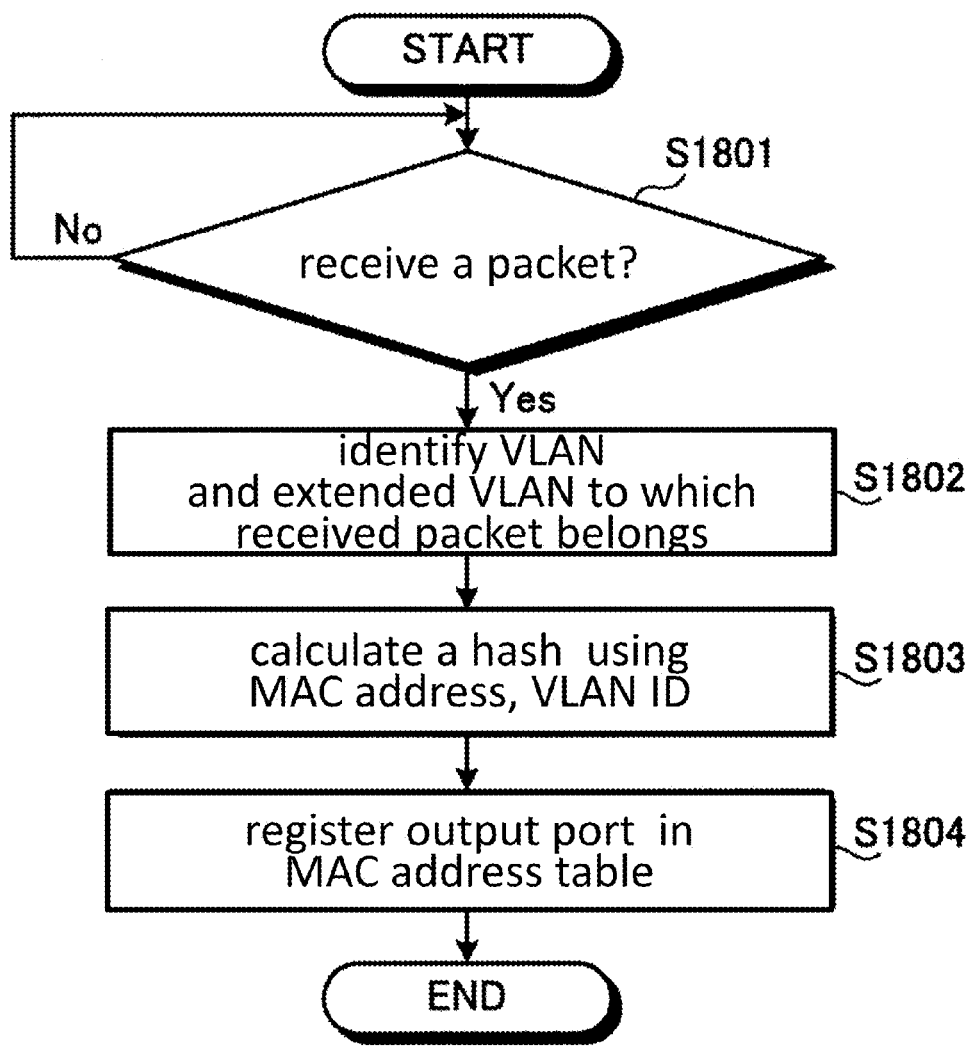
FIG. 18 is a flowchart illustrating a learning process procedure for packet forwarding in the second exemplary embodiment.

A learning process procedure for packet forwarding in the second exemplary embodiment will be described first. FIG. 18 is a flowchart illustrating the learning process procedure for packet forwarding in the second exemplary embodiment. In the flowchart of FIG. 18, determination is made first as to whether a packet 102 has been received at any of the ports 301 of the switch 100 (step S1801). The process is in a wait state until it is determined that a packet 102 has been received (the "No" loop at step S1801). When it is determined that a packet 102 has been received ("Yes" at step S1801), the VLAN group and extended VLAN to which the received packet 102 belongs are identified (step S1802).

When the VLAN and extended VLAN groups are identified at step S1802, a hash value is calculated by using the MAC address and the VLAN ID (step S1803). An output port as well as the MAC addresses and the VLAN ID is registered in an entry indicated by the hash value calculated at step S1803 as a data row (step 1804) and then the learning process will end.

FIG. 19 is a table illustrating exemplary settings of the MAC address table built in the learning process in the second exemplary embodiment. Since only MAC addresses and VLAN IDs are registered in the MAC address table in the second exemplary embodiment as in data rows 1901 and 1902 of the MAC address table 1900, the data rows of ports 5 and 15 created are identical. Determination as to whether the MAC address of an input packet 102 has been learned or not can be made by taking into consideration extended VLAN.

Look-Up Process

Figure 20:
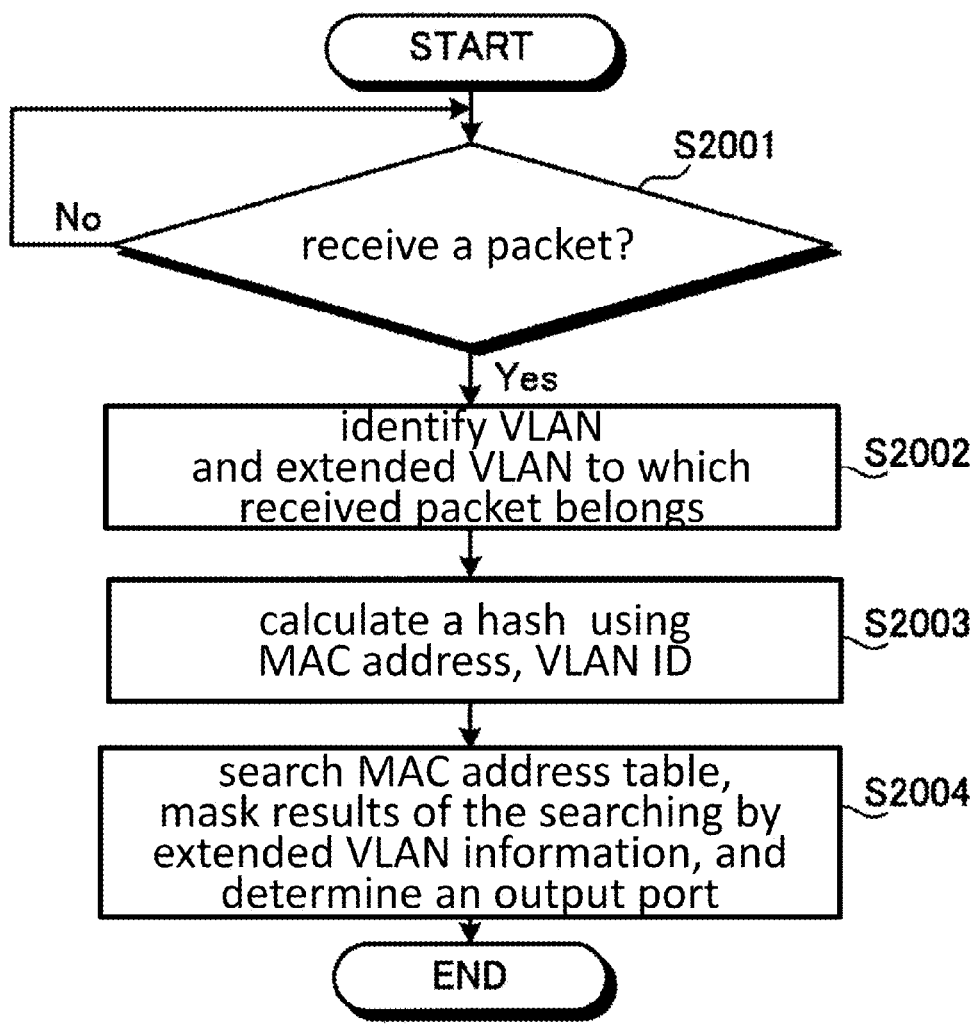
FIG. 20 is a flowchart illustrating a look-up process procedure for packet forwarding in the second exemplary embodiment.

A look-up process procedure for packet forwarding in the second exemplary embodiment will be described next. FIG. 20 is a flowchart illustrating the look-up process procedure for packet forwarding in the second exemplary embodiment. In the flowchart of FIG. 20, determination is made first as to whether a packet 102 has been received (step S2001). The process waits until a packet 102 is received (the loop of "No" at step S2001). When a packet 102 is received ("Yes" at step S2001), the VLAN and extended VLAN groups to which the received packet 102 belongs are identified (step S2002).

When the VLAN and extended VLAN are identified at step S2002, the MAC address and VLAN ID are used to calculate a hash value (step S2003). The hash value calculated at step S2003 is used to search the MAC address table for output ports and the search results are masked using extended VLAN information to determine an output port (step S2004) and then the look-up process will end.

FIG. 21 is a table illustrating exemplary settings in the MAC address table used in the look-up process in the second exemplary embodiment. Data rows 2101 and 2102 of the MAC address table 2100 could not been differentiated by referring to only MAC addresses and VLAN IDs in a conventional switch and a correct output port could not been determined. In the second exemplary embodiment, in contrast, data rows 2101 and 2102 found are ANDed with the extended VLAN ID (masking) and the value of a port having a different extended VLAN ID is nullified. As a result, only one of data rows 2101 and 2102 that contains the matching extended VLAN ID is selected and thus a correct output port can be determined.

As has been described above, in the second exemplary embodiment, the extended VLAN ID of the VLAN to which a packet 102 belongs is identified by using as partition information the port through which the packet 102 has been input. Then, masking with the extended VLAN ID is applied to the results of search using the MAC address and VLAN ID and thereby correct packet forwarding according to the partition can be achieved.

Third Exemplary Embodiment

Figure 22:
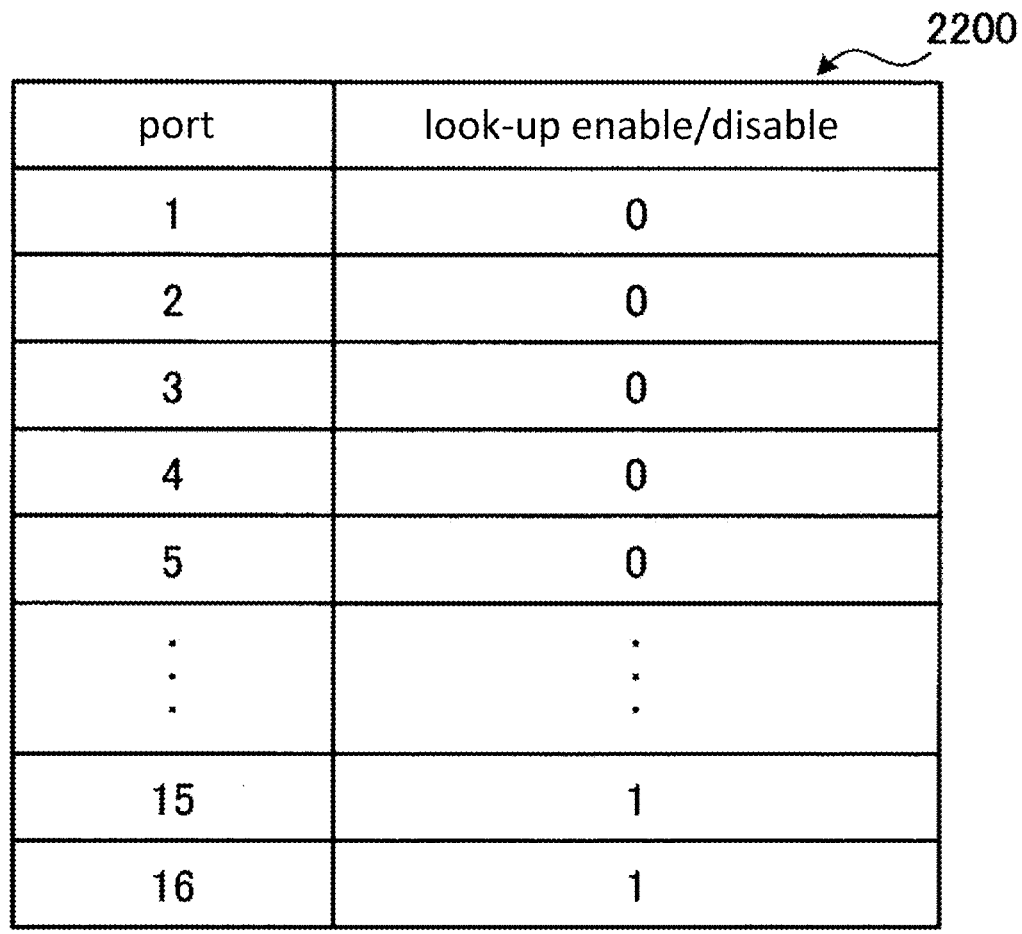
FIG. 22 is a table illustrating exemplary look-up enable/disable parameter settings.

A third exemplary embodiment will be described next. In the third exemplary embodiment, hit/miss determination is made by referring to a table in which a look-up enable/disable parameter is set. FIG. 22 is a table illustrating exemplary settings of the look-up enable/disable parameter. As illustrated in FIG. 22, the look-up enable/disable parameter is set for each port in the table 2200. In the table 2200, "1" denotes the enable state and "0" denotes the disable state.

Figure 28:
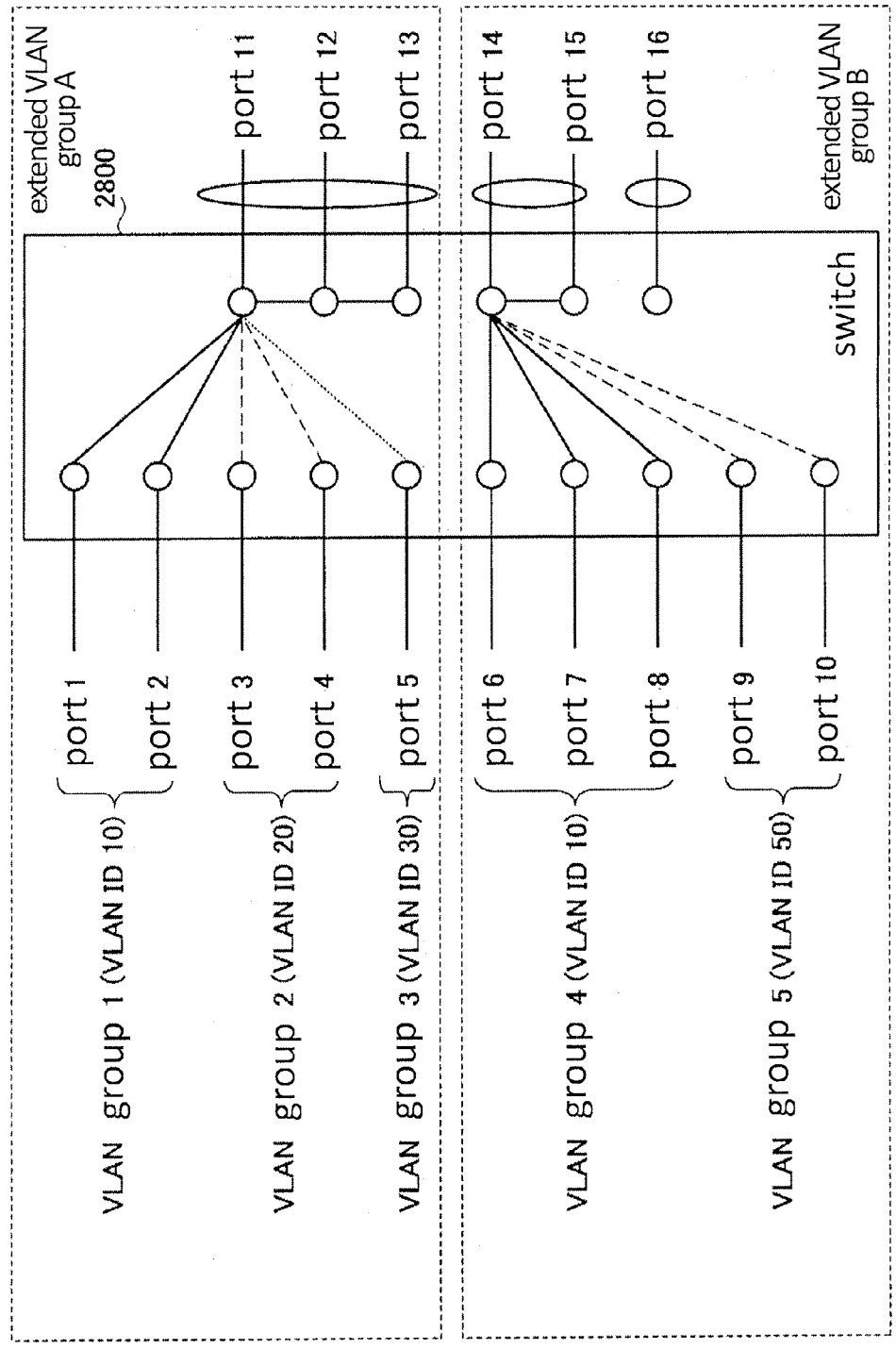
FIG. 28 is an illustration of settings of conventional VLANs and extended VLANs.
Figure 29A:
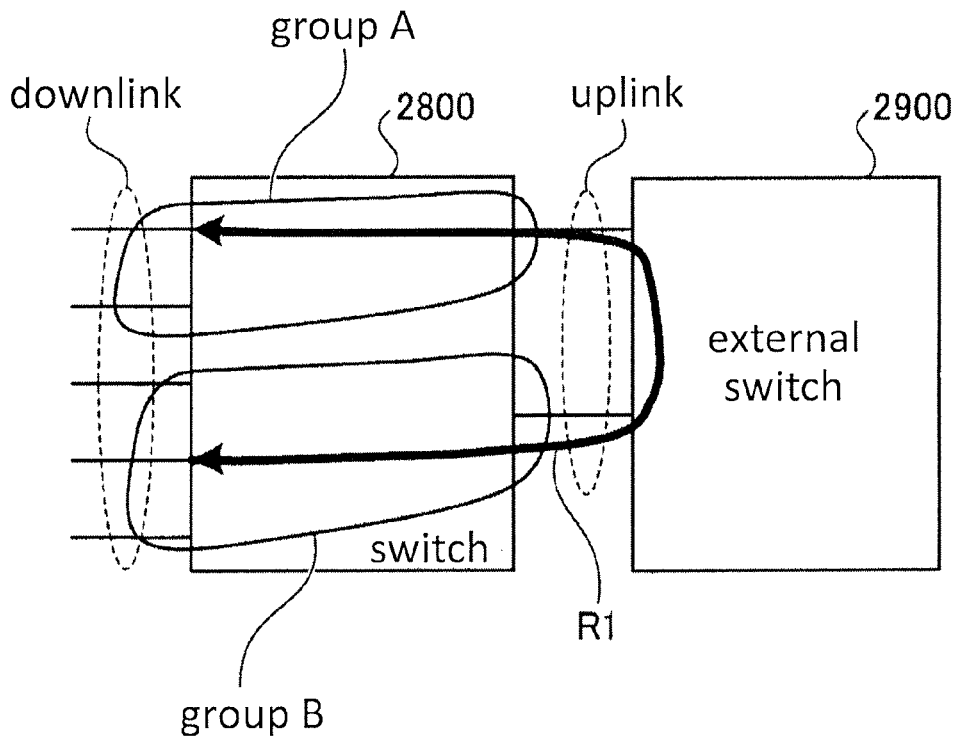
FIG. 29A illustrates request operation for blade server communication through an external switch.
Figure 29B:
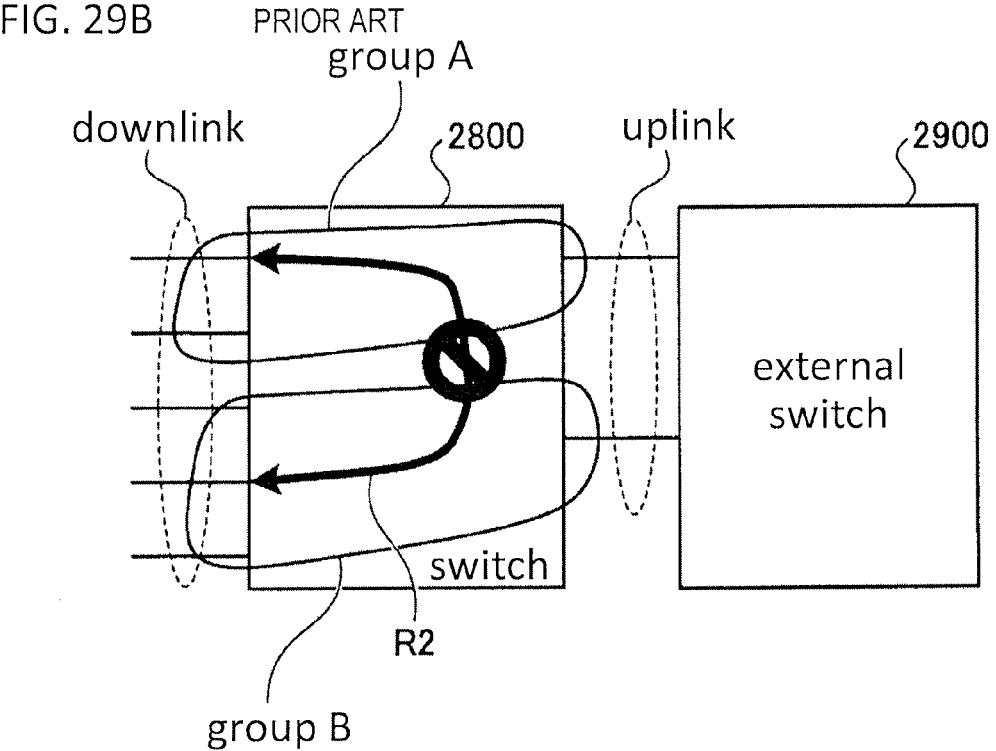
FIG. 29B illustrates actual operation in blade server communication through an external switch.

The table 2200 illustrates an example of an application to the switch 2800 described with respect to FIG. 28. Ports 1 to 10 of the switch 2800 are downlink ports and ports 11 to 16 are uplink ports. Accordingly, the look-up disable (0) is set for ports 1 to 10 to prevent flooding to the downlinks and the look-up enable (1) is set for ports 11 to 16.

Figure 23:
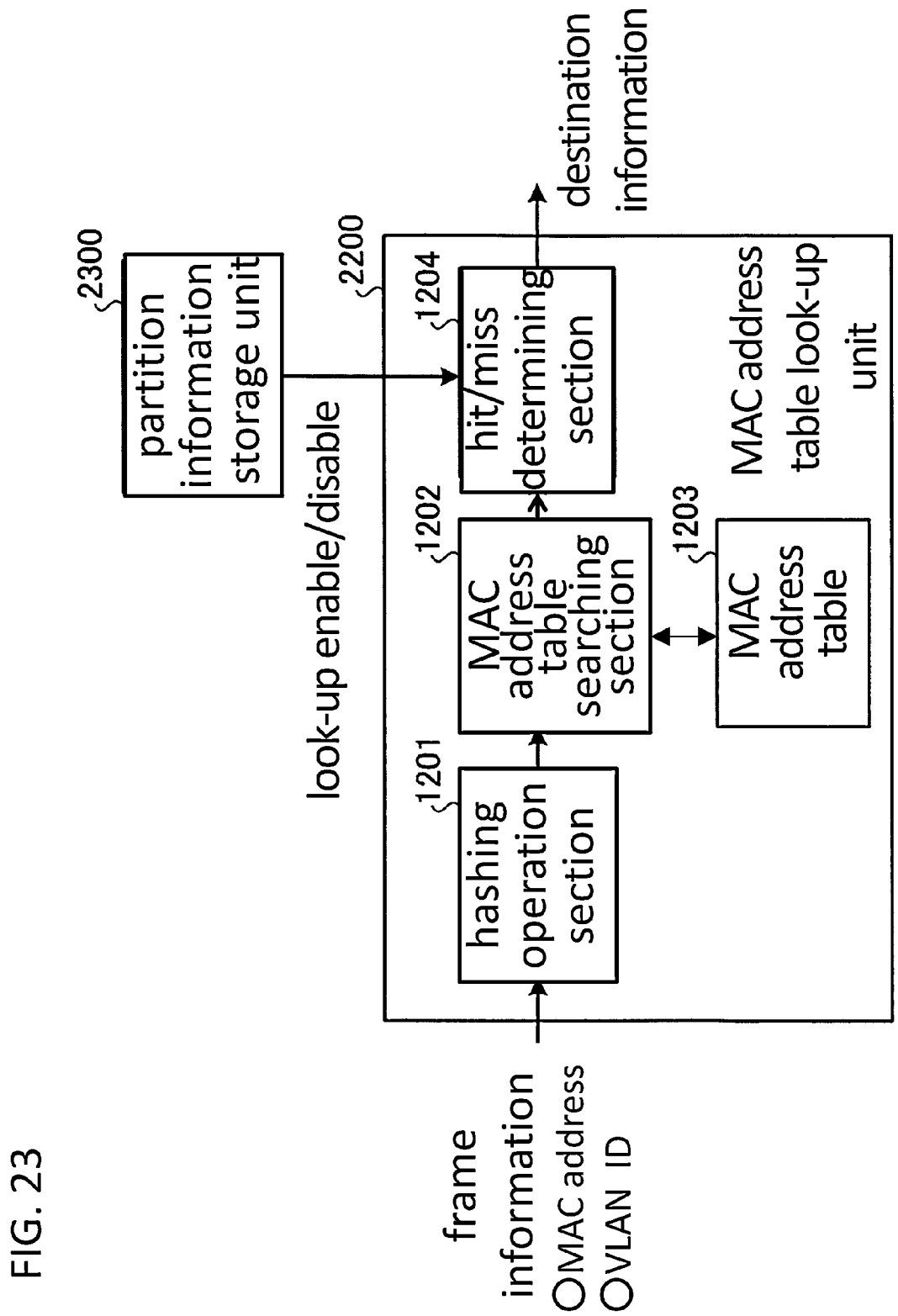
FIG. 23 is a block diagram illustrating a configuration of a routing module in a third exemplary embodiment.

FIG. 23 is a block diagram illustrating a configuration of a routing module in the third exemplary embodiment. A MAC address table look-up section 2350 in the third exemplary embodiment has the same configuration as the MAC address table look-up unit in the first exemplary embodiment, except that the look-up enable/disable parameter setting table 2200 described with reference to FIG. 22 is provided in the partition information storage unit 2300.

As in the first exemplary embodiment, a result of search by a MAC address table searching section 1202 is input in a hit/miss determining section 1204. As described above, in the third exemplary embodiment, the extended VLAN to which an input packet 102 belongs is not referred to, but learning enable/disable is controlled to prevent more than one port having a matching MAC address and VLAN ID from being registered. Look-up enable/disable parameter settings for such ports found are read from the look-up enable/disable parameter setting table. If the look-up disable is set for any of the ports, the port or ports are determined to be a miss, (not found) and the packet 102 is flooded to the uplink ports that belong to the same extended VLAN group as the packet 102.

In this way, the look-up enable or disable can be set for each port in the look-up enable/disable parameter setting table in the third exemplary embodiment. Using this feature, the option to prevent communication between downlinks can be enabled to flood a packet without performing look-up in the case of downlink-to-uplink forwarding, and to perform look-up only in the case of uplink-to-downlink forwarding. Here, a setting can be made such that the MAC address table is dynamically learned as packet forwarding is performed to downlink and the MAC address table is not dynamically learned during uplink forwarding. Consequently, only one port will have the matching MAC address and matching VLAN ID and therefore incorrect forwarding due to the influence of address learning which would otherwise be performed during uplink forwarding can be prevented.

A learning process and a look-up process after the learning performed by a routing module 323 in the third exemplary embodiment will be separately described below.

Learning Process (Downlink Only)

Figure 24:
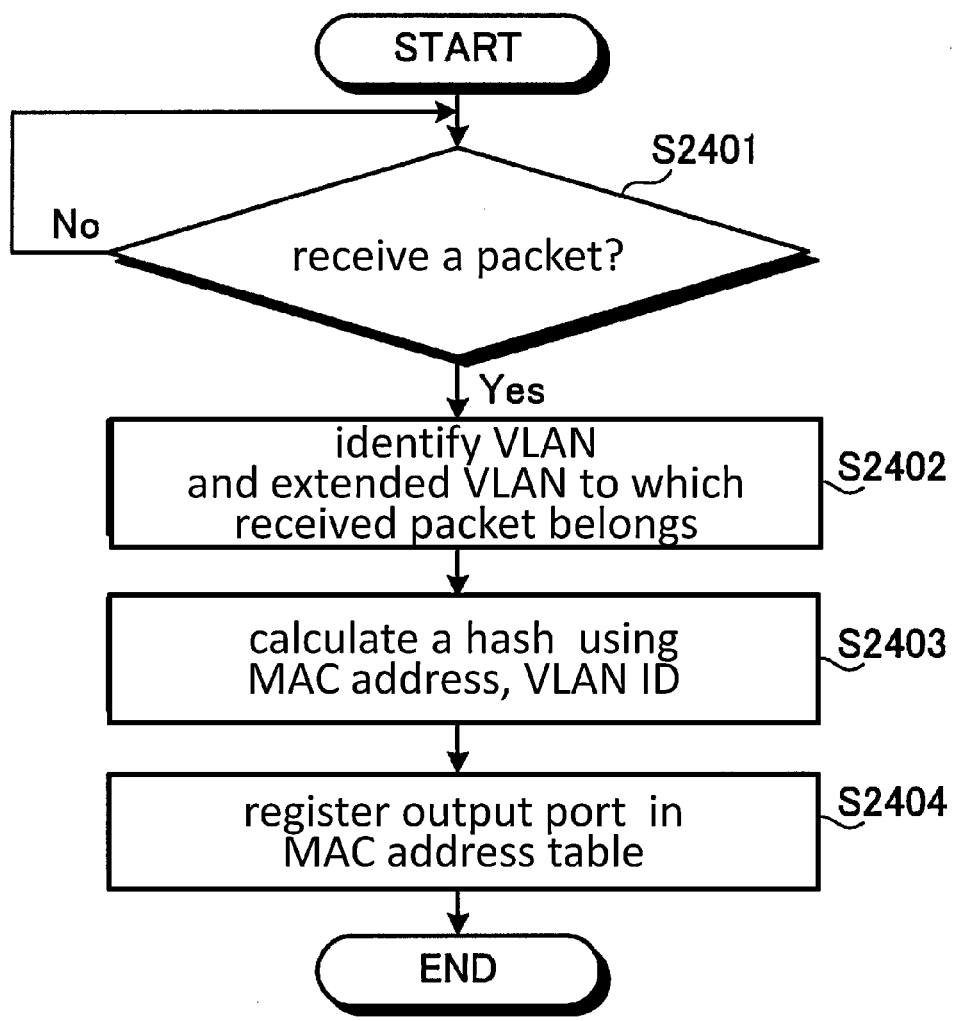
FIG. 24 is a flowchart illustrating a learning process procedure for packet forwarding in the third exemplary embodiment.

A learning process procedure for packet forwarding in the third exemplary embodiment will be described first. FIG. 24 is a flowchart illustrating the learning process procedure for packet forwarding in the third exemplary embodiment. In the flowchart of FIG. 24, determination is made first as to whether any of the ports 301 of the switch 100 has received a packet 102 (step S2401). The process is in a wait state until it is determined that a packet 102 has been received (the "No" loop at step S2401). When it is determined that a packet 102 has been received ("Yes" at step S2401), the VLAN and extended VLAN to which the received packet 102 belongs are identified (step S2402).

When the VLAN and extended VLAN groups are identified at step S2402, a hash value is calculated by using the MAC address and the VLAN ID (step S2403). An output port is registered in the entry indicated by the hash value calculated at step S2403 together with the MAC address and the VLAN ID as a data row (step S2404), and then the learning process will end.

FIG. 25 is a table illustrating exemplary settings in the MAC address table built in the learning process in the third exemplary embodiment. While ports 5 and 15 were selected as having the matching combination of MAC address and VLAN ID in the first and second exemplary embodiments, only the data row 2501 corresponding to port 5 is recorded as illustrated in the MAC address table 2500 in the third exemplary embodiment because learning is not performed for uplinks in the third exemplary embodiment as described above.

Figure 26:
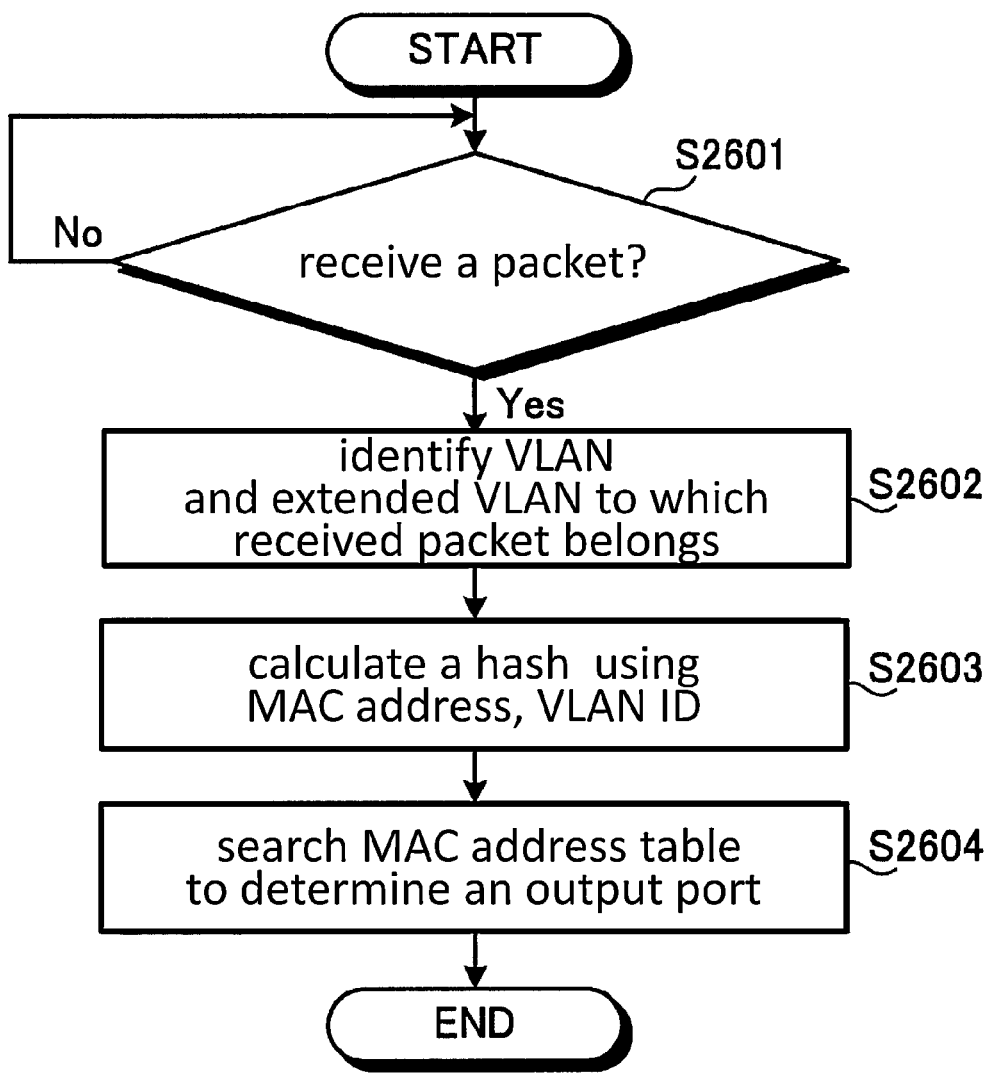
FIG. 26 is a flowchart illustrating a look-up process procedure for packet forwarding in the third exemplary embodiment.

A look-up process procedure for packet forwarding in the third exemplary embodiment will be described next. FIG. 26 is a flowchart illustrating the look-up process procedure for packet forwarding in the third exemplary embodiment. In the flowchart of FIG. 26, determination is made first as to whether any of the ports 301 of the switch 100 has received a packet 102 (step S2601). The process is in a wait state until it is determined that any of the ports 301 of the switch 100 has received a packet 102 (the "No" loop at step S2601). When it is determines that a packet 102 has been received ("Yes" at step S2601), the VLAN and extended VLAN to which the received packet 102 belongs are identified (step S2602).

After the VLAN and extended VLAN groups are identified at step S2602, a hash value is calculated by using the MAC address and the VLAN ID (step S2603). The hash value calculated at step S2603 is used to search the MAC address table to determine an output port (step S2604), and then the look-up process will end. In the case of forwarding from a downlink to an uplink, the look-up disable is set to flood the packet to forward the packet to the corresponding uplink port. In the case of forwarding from an uplink to a downlink, the packet is forwarded to the learned port.

FIG. 27 is a table illustrating exemplary settings in the MAC address table used in the look-up process in the third exemplary embodiment. When data row 2701 in the MAC address table 2700 is found, as described above, the hit/miss determining section 1204 determines whether the search result is validated or not and outputs output port information based on the determination.

As has been described, in the third exemplary embodiment, enable/disable of address learning for uplink and downlink can be controlled by setting a look-up enable/disable parameter in the look-up enable/disable parameter setting table. This enables packet forwarding through an external switch.

While the hashing operation section is provided to hash MAC addresses, VLAN IDs, and extended VLAN IDs obtained from frame information in order to facilitate implementation of the table in the first to third exemplary embodiments, the hashing operation section is optional.

As described above, in a switch 100 according to any of the present embodiments, an output port is identified by referring to an address table in which associations among extended VLAN IDs, VLAN IDs, and MAC addresses are set. Accordingly, packets 102 can be forwarded to a correct destination without being discarded even though there is more than one combination of MAC address and VLAN ID in the switch 100 partitioned into multiple partitions. Accordingly, the switch 100 can provide a secure network environment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A switch which includes a plurality of ports, each of the ports being assigned to any of groups into which the switch is logically partitioned using Virtual Local Area Networks (VLANs), and outputs a packet received at any of the ports to a port corresponding to a destination address of the packet, the switch comprising:

a memory in which an address table and a setting table are recorded, the address table containing a first entry in which a destination address, an output port corresponding to the destination address, a VLAN group ID, and an extended VLAN group ID are associated with each other, and the setting table containing a second entry for each of the ports in which a setting indicating whether searching for a port corresponding to a destination address is enabled or disabled is made; and a processor configured to:

acquire a source address from the packet received on the port and group information of a VLAN to which the packet belongs from the packet or an attribute of the port, from the packet received on the port;

register in the address table the source address as the destination address in accordance with the second entry, the port at which the packet has been received as the output port corresponding to the destination address, and the group information of the VLAN acquired as the VLAN group in association with each other;

search the address table for a data row including items that matches the destination address, the VLAN group ID, and an extended VLAN group ID; and determine an output port registered in association with the data row found in the search as an output port corresponding to the destination address, wherein when a new packet is received at the port, the processor acquires a source address from the new packet and acquires the group information of the VLAN to which the new packet belongs from the packet or from an attribute of the port, and the processor refers to the setting table containing a second entry for each of the ports in which a setting indicating whether searching for a port corresponding to a destination address is enabled or disabled is made, and searches the address table for a data row that matches both of the destination address in accordance with the acquired source address of the new packet and the VLAN group ID in accordance with the identified group information of the VLAN, and wherein if a matching data row is found in the search and a setting indicating that searching is enabled is made for the port in the setting table, the processor determines an output port registered in association with the data row as the output port corresponding to the destination address of the new packet, and if a matching data row is found in the search and a setting indicating that searching is disabled is made for the port in the setting table, the processor determines, as an output port to which the new packet is to be flooded, an output port having matching VLAN group ID and matching extended VLAN group ID associated with the port at which the new packet has been received.

* * * * *